United States Patent
Xie et al.

(10) Patent No.: US 12,260,453 B2
(45) Date of Patent: *Mar. 25, 2025

(54) GENERATING DYNAMIC BASE LIMIT VALUE USER INTERFACE ELEMENTS DETERMINED FROM A BASE LIMIT VALUE MODEL

(71) Applicant: Chime Financial, Inc., San Francisco, CA (US)

(72) Inventors: Erin Xie, San Francisco, CA (US); Aashna Agarwal, Mountain View, CA (US); Aoni Wang, Redwood City, CA (US); Braden Staudacher, Vancouver (CA); Dennis Jiang, San Francisco, CA (US); Lucy Liu, Vancouver (CA)

(73) Assignee: Chime Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,003

(22) Filed: Mar. 4, 2024

(65) Prior Publication Data
US 2024/0346577 A1   Oct. 17, 2024

Related U.S. Application Data

(63) Continuation of application No. 18/062,496, filed on Dec. 6, 2022, now Pat. No. 11,922,491.

(51) Int. Cl.
*G06Q 40/02* (2023.01)
(52) U.S. Cl.
CPC .................................. *G06Q 40/02* (2013.01)

(58) Field of Classification Search
CPC ..................................................... G06Q 40/02
See application file for complete search history.

(56) References Cited

U.S. PATENT DOCUMENTS

| | | |
|---|---|---|
| D754,165 S | 4/2016 | Park et al. |
| D754,689 S | 4/2016 | Lee et al. |
| | (Continued) | |

OTHER PUBLICATIONS

U.S. Appl. No. 18/062,496, Mar. 10, 2023, Office Action.
(Continued)

*Primary Examiner* — Elda G Milef
(74) *Attorney, Agent, or Firm* — Keller Preece PLLC

(57) ABSTRACT

The disclosure describes embodiments of systems, methods, and non-transitory computer readable storage media that utilize a variety of machine learning models and a base limit value model to generate user interface elements that transparently and efficiently present current and future base limit values for user accounts. For example, the disclosed systems can utilize a machine learning model to determine a base limit value, subsequent base limit value, and user activity conditions to achieve the subsequent base limit value for a user account. Then, the disclosed systems can display a base limit progress element that indicates progress towards fulfilling the user activity conditions to achieve the subsequent base limit value. For example, the disclosed systems can display, within a graphical user interface, multiple base limit progress elements that indicate progress towards fulfilling the user activity conditions in separate time-based segments (e.g., to represent time elements within the user activity conditions).

20 Claims, 20 Drawing Sheets

(56) References Cited

U.S. PATENT DOCUMENTS

| | | | |
|---|---|---|---|
| D756,379 S | 5/2016 | Apodaca et al. | |
| D757,038 S | 5/2016 | Bain | |
| D761,812 S | 7/2016 | Motamedi | |
| D791,156 S | 7/2017 | Chen et al. | |
| D804,522 S | 12/2017 | Sachtieben et al. | |
| 10,080,530 B2 | 9/2018 | Cheng et al. | |
| D834,043 S | 11/2018 | Di Nicola et al. | |
| D849,039 S | 5/2019 | Huh et al. | |
| D860,231 S | 9/2019 | Hussain | |
| 10,444,966 B2 | 10/2019 | Seong | |
| 10,866,716 B2 | 12/2020 | Sinclair et al. | |
| 10,955,995 B2 | 3/2021 | Burch et al. | |
| 11,017,466 B1 | 5/2021 | Cunningham et al. | |
| 11,042,930 B1 | 6/2021 | Mintz et al. | |
| 11,321,771 B1 * | 5/2022 | Horesh | G06Q 20/108 |
| 11,521,214 B1 | 12/2022 | Hetrick et al. | |
| 11,899,871 B2 | 2/2024 | Castaneda et al. | |
| D1,055,955 S | 12/2024 | Kim et al. | |
| 2014/0173439 A1 | 6/2014 | Gutierrez et al. | |
| 2014/0211933 A1 | 7/2014 | Vymenets et al. | |
| 2016/0058336 A1 | 3/2016 | Blahnik et al. | |
| 2017/0046121 A1 | 2/2017 | Lee et al. | |
| 2018/0293038 A1 | 10/2018 | Meruva et al. | |
| 2021/0090161 A1 | 3/2021 | Chen et al. | |
| 2021/0133868 A1 * | 5/2021 | Brock | G06Q 20/102 |
| 2021/0133894 A1 * | 5/2021 | Reses | G06N 20/00 |
| 2022/0036052 A1 | 2/2022 | Prince et al. | |
| 2022/0084134 A1 | 3/2022 | Brock et al. | |
| 2022/0245641 A1 | 8/2022 | Wintle et al. | |
| 2022/0366493 A1 | 11/2022 | Arora et al. | |
| 2023/0046919 A1 | 2/2023 | Dhodapkar | |
| 2024/0346577 A1 | 10/2024 | Xie et al. | |

OTHER PUBLICATIONS

U.S. Appl. No. 18/062,496, Jun. 27, 2023, Office Action.

U.S. Appl. No. 18/062,496, Oct. 10, 2023, Notice of Allowance.

Deepika Rao, Fitness App, posted Aug. 22, 2022 [online], Retrieved from internet Aug. 7, 2024, https://dribbble.com/shots/19187059-Fitness-App (Year: 2022).

Isiddheshm, Set Of Infographic Percentage Pie Chart Icons In Flat Style Design For Website, posted Oct. 7, 2021 [online], Ret. from internet Aug. 7, 2024, https://www.istockphoto.com/vector/set-of-infographic-percentage-pie-chart-icons-in-flat-style-design-for-website-app-g m 1345340123-423445570?search (Year: 2021).

Makhbubakhon Ismatova, Circle Progress Bar Set Infographic User Interface Vector Illustration Design Stock Illustration, posted Jul. 4, 2020 [online], Ret. from internet Aug. 15, 2024, https://www.istockphoto.com/vector/circle-progress-bar-set-infographic-user-interface-vector-illustration-design-g m 125 (Year: 2020).

PJ P. for Liferay Design, Retirements Savings Account—Mobile, posted Aug. 21, 2020 [online], Retrieved from internet Aug. 7, 2024, https://dribbble.com/shots/ 14057678-Retirements-Savings-Account-Mobile (Year: 2020).

Puspesh Deolal, 21 Best Circular Progress Bar HTML & CSS, posted Nov. 28, 2018 [online], Retrieved from internet Aug. 13, 2024, https://www.digitaldesignjournal.com/best-circular-progress-bar-htm I-css/ (Year: 2018).

Sara Cotner, Goal Tracking App, posted Oct. 17, 2017 [online], Retrieved from internet Aug. 7, 2024, https://feedingthesoil.com/2017/10/17/goal-tracking-app/ (Year: 2017).

Ujjwal Bhardwaj, Linear Progress Indicator In Flutter, posted Sep. 5, 2021 [online], Retrieved from internet Aug. 7, 2024, https://www.getwidget.dev/blog/flutter-progress-bar-indicator/ (Year: 2021).

U.S. Appl. No. 29/868,535, Jan. 10, 2025, Office Action.

\* cited by examiner

1500

```
┌─────────────────────────────────────────────────────────────────────┐
│ Determining A Base Limit Value, A Subsequent Base Limit Value, And User │
│   Activity Conditions To Achieve The Subsequent Base Limit Value 1510  │
└─────────────────────────────────────────────────────────────────────┘
                                  ▼
┌─────────────────────────────────────────────────────────────────────┐
│   Providing An Indication Of The Base Limit Value And The Subsequent Base │
│                         Limit Value 1520                            │
└─────────────────────────────────────────────────────────────────────┘
                                  ▼
┌─────────────────────────────────────────────────────────────────────┐
│  Providing A First Base Limit Progress Element For A First Time-Based │
│  Segment And A Second Base Limit Progress Element For A Second Time- │
│                         Based Segment 1530                          │
└─────────────────────────────────────────────────────────────────────┘
```

*Fig. 15*

GENERATING DYNAMIC BASE LIMIT VALUE USER INTERFACE ELEMENTS DETERMINED FROM A BASE LIMIT VALUE MODEL

CROSS-REFERENCE TO RELATED APPLICATIONS

This application is a continuation of U.S. patent application Ser. No. 18/062,496, filed on Dec. 6, 2022. The entire contents of the foregoing application are hereby incorporated by reference in its entirety.

BACKGROUND

Recent years have seen a significant development in systems that utilize web-based and mobile-based applications to manage user accounts and digital information for user accounts in real time. For example, many conventional applications provide various graphical user interfaces (GUIs) to present digital information and options to client devices. This often includes determining or calculating account-specific values or limits and communicating such information via the web-based and mobile-based applications. Although conventional systems attempt to determine and communicate digital information to user accounts on web-based and mobile-based applications, such conventional systems face a number of technical shortcomings, particularly with regard to flexible and efficient user interfaces that display obscure, non-transparent outputs from computer-based models.

For example, many conventional systems utilize computer-based models that act as a black box mechanism and, as a result, provide outputs that are difficult to navigate within a GUI. For instance, conventional systems oftentimes utilized computer-based models that analyze a large number of variables and, without providing an understandable reasoning, generate a prediction or determination. Accordingly, many conventional systems are limited to rigid GUIs that are unable to provide insight into both determinations and how future or predicted actions will impact determinations of the computer-based models.

In addition, many conventional systems inefficiently utilize computational resources due to computer-based model outputs and the resulting inflexible user interfaces. For example, conventional systems often require navigation between multiple user interfaces to understand an output of a computer-based model and also to understand future actions (or behaviors) that would yield a particular outcome from the computer-based model. Indeed, in addition to receiving an obscure output from a computer-based model, many conventional systems fail to accurately visualize outputs from the computer-based models while also providing insight into the output within limited screen spaces of GUIs in mobile devices.

Furthermore, many conventional systems are unable to accurately determine account-specific values or limits through computer models. For example, conventional systems fail to accurately determine account-specific limits that accurately reflect underlying risks based on numerous factors or variables corresponding to digital accounts.

SUMMARY

This disclosure describes one or more embodiments of systems, methods, and non-transitory computer readable media that provide benefits and solve one or more of the foregoing or other problems by utilizing a variety of machine learning models and a base limit value model to generate user interface elements that transparently and efficiently present current and future base limit values for user accounts. For example, the disclosed systems can select from between multiple activity machine learning models based on a user activity duration and utilize the selected activity machine learning model with user activity data to determine an activity score. Then, the disclosed systems can determine a base limit value (reflecting a value limit for excess account withdrawals) using a base limit value model that includes relations between activity scores and various user activity conditions. For example, the base limit value model can include a base limit value matrix or a base limit value tiered data table. In addition to determining the base limit value, the disclosed systems can also utilize the base limit value model to determine a subsequent base limit value and user activity conditions that achieve the subsequent base limit value.

Moreover, the disclosed systems can generate user interface elements within a graphical user interface to display the determined base limit value, the subsequent base limit value, and user activity conditions to achieve the subsequent base limit value from the base limit value model within a single graphical user interface. As an example, in some instances, the disclosed systems generate base limit progress elements within a single graphical user interface that indicate the user activity conditions fulfilled to achieve the subsequent base limit value across different time-based segments to transparently and efficiently present current and future base limit values with steps to achieve the future base limit values in a base limit value model.

BRIEF DESCRIPTION OF THE DRAWINGS

The detailed description is described with reference to the accompanying drawings in which:

FIG. 15 illustrates a flowchart of a series of acts for displaying base limit progress elements to track user activity conditions to achieve a subsequent base limit value in accordance with one or more implementations.

DETAILED DESCRIPTION

Figure 1:
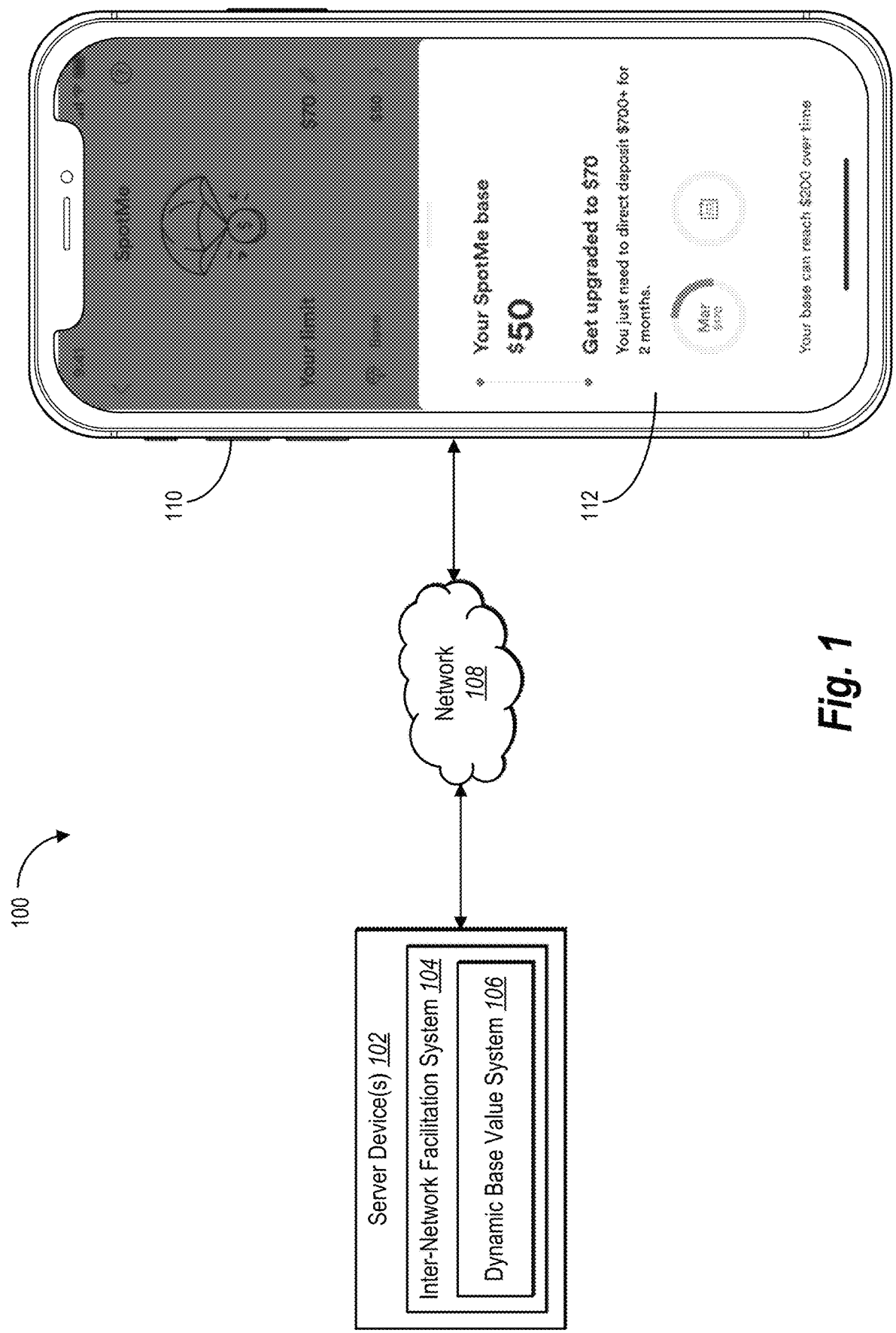
FIG. 1 illustrates a schematic diagram of an environment for implementing an inter-network facilitation system and a dynamic base value modeling system in accordance with one or more implementations.

The disclosure describes one or more embodiments of a dynamic base value modeling system that utilizes various machine learning models and a dynamic base limit value model to generate user interface elements that transparently and efficiently present determined base limit values, subsequent base limit values, and user activity conditions within a graphical user interface. To illustrate, the dynamic base value modeling system can utilize a machine learning model to determine a base limit value, subsequent base limit value, and user activity conditions to achieve the subsequent base limit value for a user account. Furthermore, the dynamic base value modeling system can display, within a graphical user interface, a base limit progress element that indicates progress towards fulfilling the user activity conditions to achieve the subsequent base limit value. For example, the dynamic base value modeling system can display, within the graphical user interface, multiple base limit progress elements that indicate progress towards fulfilling the user activity conditions in separate time-based segments (e.g., to represent time elements within the user activity conditions).

For example, in some implementations the dynamic base value modeling system first determines, utilizing a machine learning model, a base limit value, subsequent base limit value, and user activity conditions to achieve the subsequent base limit value for a user account. For example, the dynamic base value modeling system can select an activity machine learning model from multiple activity machine learning models utilizing a user activity duration corresponding to a user account. In addition, the dynamic base value modeling system can generate an activity score for the user account by utilizing the selected activity machine learning model and user activity data of the user account. Furthermore, the dynamic base value modeling system can determine a base limit value from the activity score using a base limit value model. Moreover, the dynamic base value modeling system can also utilize the base limit value model to determine a subsequent base limit value and user activity conditions that achieve the subsequent base limit value.

As an example, the dynamic base value modeling system can select from between activity machine learning models based on a user activity duration. For instance, the dynamic base value modeling system can access a plurality of decision trees trained on different historical training data reflecting different user activity durations. The dynamic base value modeling system can identify an activity machine learning model trained specifically for a duration of activity associated with a user account. Then, the dynamic base value modeling system can utilize user activity data of the user account with the selected activity machine learning model to generate an activity score indicating a risk level for the user account.

Moreover, the dynamic base value modeling system can determine a base limit value from the activity score utilizing a base limit value model. For example, the dynamic base value modeling system can generate a base limit value that reflects an excess limit that a client can withdraw from an account without penalty. In certain instances, the dynamic base value modeling system can utilize a base limit value matrix to determine the base limit value. In particular, the dynamic base value modeling system can identify particular base limit values that map to particular activity scores and particular user activity conditions within the base limit value matrix to determine a base limit value, subsequent base limit value, and one or more user activity conditions.

In some embodiments, the dynamic base value modeling system utilizes a base limit value tiered data table as the base limit value model to determine a base limit value for a user account. To illustrate, the dynamic base value modeling system can utilize an activity score determined for a user account to select a base limit value tiered data table from multiple base limit value tiered data tables that correspond to various activity scores (e.g., varying configurations for varying activity scores). In some embodiments, the base limit value tiered data table includes base limit values and user activity conditions to satisfy to achieve subsequent base limit values within the base limit value tiered data table. The dynamic base limit modeling system can utilize the base limit value tiered data table with user activity of a user account to determine a base limit value, a subsequent base limit value, and the one or more user activity conditions to achieve the subsequent base limit value.

Furthermore, in one or more embodiments, the dynamic base limit modeling system generates and displays user interface elements to transparently and efficiently present base limit values, subsequent base limit values, and user activity conditions. As an example, the dynamic base limit modeling system can display a graphical user interface for a software application with user account information of a particular user account. For instance, the dynamic base limit modeling system can display, within the graphical user interface, a determined base limit value, subsequent base limit value, and user activity conditions to achieve the subsequent base limit value for the user account in a single interface. Additionally, upon identifying updated user activity corresponding to the user account, the dynamic base limit modeling system can determine updated user activity conditions to achieve the subsequent base limit value (from the dynamic base limit value model) and display, within the graphical user interface, the updated user activity conditions to achieve the subsequent base limit value.

In one or more implementations, the dynamic base value modeling system generates and displays one or more base limit progress elements that indicate progress of detected user activities toward fulfilling the user activity conditions to achieve the subsequent base limit value across one or more time-based segments. For instance, the dynamic base value modeling system can display a base limit progress element that depicts a fillable shape which represents a time-based segment (e.g., a month, week, day) and a color element to track user activities that (completely or partially) fulfill user activity conditions within a time frame. In some embodiments, the dynamic base value modeling system displays a first base limit progress element indicating completed progress toward fulfilling the user activity conditions corresponding to a first time-based segment and a second base limit progress element indicating partial progress toward fulfilling the user activity conditions corresponding to a second time-based segment to track progress towards fulfilling the user activity conditions to achieve the subsequent base limit value. As described in greater detail below, the dynamic base value modeling system can display various instances and combinations of base limit progress elements to transparently and efficiently present base limit values, subsequent base limit values, and user activity conditions across different time-based segments.

The dynamic base limit modeling system can provide numerous advantages, benefits, and practical applications relative to conventional systems. For example, unlike conventional systems that often utilize computer-based models that provide outputs in difficult to navigate GUIs, the dynamic base limit modeling system can utilize various machine learning models and base limit value models to determine and provide current and future base limit values together with information for achieving the future base limit values. In certain instances, the dynamic base limit modeling system can generate flexible user interfaces that provide transparency and insight into a combined machine learning model and base value model that utilizes various variables to determine base limit values, subsequent base limit values, and user activity conditions to achieve the subsequent base limit values. By providing such transparency, the dynamic base limit modeling system can generate increasingly robust and flexible GUIs to provide practical applications from outputs and behaviors of computer-based base limit value model.

In addition to GUI flexibility, the dynamic base limit modeling system can also generate GUIs to visualize model outputs and improve computing efficiency. In particular, by generating and displaying base limit values, subsequent base limit values, and user activity conditions to achieve subsequent base limit values, the dynamic base limit modeling system reduces the number of navigational steps required within a GUI in a limited screen space of a mobile device. Accordingly, the dynamic base limit modeling system efficiently utilizes screen space and also utilizes less computational resources due to the reduction in navigation between different user interfaces (and/or information sources) to determine or interpret the outputs of a base limit value model. Additionally, the dynamic base value modeling system also enables a graphical user interface to display the base limit values, subsequent base limit values, and user activity conditions to achieve subsequent base limit values in different time-based segments to reduce the number of navigational steps needed to determine whether user activity conditions were fulfilled in one or more different time frames.

Furthermore, the dynamic base limit modeling system also reduces the number of inquiries and/or electronic communications that are taken to identify information regarding a base limit value (or other output) of a base limit value model from a user account. In particular, the dynamic base limit modeling system can generate GUIs that determine and display the base limit value and user activity conditions that contribute to the determined base limit value and subsequent base limit values. Accordingly, additional electronic communications to obtain such information is reduced. As a result, the dynamic base limit modeling system improves computational efficiency of implementing computing devices and networks by reducing the number of electronic communications and the accompanying network bandwidth.

In addition, the dynamic base value modeling system can accurately determine account-specific values reflecting risk associated with user accounts. More specifically, the dynamic base value modeling system utilizes multiple activity machine learning models that are specifically trained for a category of user accounts. Indeed, by utilizing and emphasizing a varying set of user activity data variables for different types of user accounts, the dynamic base value modeling system improves the accuracy of determined metrics associated with a diverse range of user accounts.

As indicated by the foregoing discussion, the present disclosure utilizes a variety of terms to describe features and advantages of the dynamic base limit modeling system. As used herein, the term "machine learning model" refers to a computer model that can be trained (e.g., tuned or learned) based on inputs to approximate unknown functions and corresponding outputs. As an example, a machine learning model can include, but is not limited to, a neural network (e.g., a convolutional neural network, recurrent neural network, or deep learning model), a decision tree (e.g., a gradient boosted decision tree, a random forest decision tree, a decision tree with variable or output probabilities), and/or a support vector machine.

Furthermore, as used herein, the term "activity machine learning model" refers to a machine learning model that can be trained to predict (or determine) an activity score for a user. In particular, an activity machine learning model can analyze input user account activity data corresponding to a user account to generate (or predict) an activity score for the user account. In some embodiments, the activity machine learning model includes a decision tree that generate probabilities for activity scores from various variables corresponding to various characteristics from user account activity data. Indeed, in one or more embodiments, the dynamic base value modeling system utilizes the probabilities corresponding to the various activity scores to select (or determine) an activity score for the user account. Additionally, in one or more embodiments, the dynamic base value modeling system can train multiple activity machine learning models to specifically generate activity scores for a category of user accounts (e.g., based on account activity duration).

As used herein, the term "activity score" refers to a value indicating a rating for a user account. In some embodiments, the activity score indicates a risk level corresponding to a user account. For example, the dynamic base value modeling system can utilize the activity score of a user account generated from an activity machine learning model to determine a base limit value utilization risk level for the user account. Indeed, the activity score of a user account can indicate the likelihood of a user account failing to pay a base limit value amount utilized by the user account. In some instances, the dynamic base value modeling system can utilize an activity score to determine a risk segment of a user account.

As used herein, the term "user activity data" refers to information (or data) associated with interactions of a user with the dynamic base value modeling system (or a corresponding client device application). For example, user activity data can include actions, durations corresponding to actions, frequencies of actions, account values, and/or other representations of interactions of a user corresponding to a user account on a client application (e.g., operating a client application as shown in FIG. 1). To illustrate, user activity data can include, but is not limited to, historical utilization of an application, a duration of satisfying a threshold account value (e.g., an amount of time that a user account satisfies a threshold account value within the user account), historical transaction activity within the user account, historical base limit value utilization, base limit value payoff times for the user account, historical flagged activities for the user account, and/or a number of declined transactions corresponding to the user account.

As used herein, the term "base limit value" refers to a numerical value that represents an excess utilization buffer for a user account. In particular, the base limit value can include a numerical value that represents an amount that a user account is permitted to obtain or transact in excess of an amount belonging to the user account. As an example, a base limit value can include a monetary overdraft amount or a line of credit.

As used herein, the term "user activity condition" refers to a benchmark action from a user account that causes a change in a base limit value corresponding to the user account. In particular, the user activity condition can include a conditional action that upon performance from a user account results in a change (or assignment) of a base limit value for the user account. As an example, the user activity condition can include a deposit transaction activity (e.g., a user account transaction that adds a monetary value within the user account), a deposit transaction amount, a frequency of a deposit transaction, and/or a user-to-user transaction activity. In some embodiments, the user activity condition can include a user activity condition tier that indicates a range or level of user activity corresponding to the user account. For instance, the user activity condition tier can include a deposit transaction activity tier that indicates a range of deposit transaction amounts corresponding to a user account (e.g., $0 to $300, $301 to $700, $1801 to $2900 in deposit transaction amounts).

As used herein, the term "base limit value model" refers to a model that determines (and/or outputs) a base limit value for a user account from an activity score and/or user activity data. For example, a base limit value model can include a mapping of information between user activity scores, user activity conditions, and base limit values. In some embodiments, the base limit value model includes a machine learning model and/or a model (or representation) generated through a machine learning model that maps user activity scores, user activity conditions, and base limit values to output base limit values based on input activity scores and/or other user activity data.

In some instances, a base limit value model includes a base limit value matrix. For example, a base limit value matrix can include activity scores and user activity conditions that intersect to reference base limit values. In addition, a base limit value model can include a base limit value tiered data table. For instance, a base limit value tiered data table can include base limit values and a set of user activity conditions that achieve subsequent base limit values in the tiered data table.

As used herein, the term "base limit progress element" refers to a graphical user interface element that visually depicts (or represents) user activity progress towards fulfilling user activity conditions to achieve a subsequent base limit value. For example, a base limit progress element can include a graphical element that depicts a fillable shape to represent multiple types of information. In some cases, the base limit progress element depicts a fillable shape having an indication of a time-based segment (e.g., via a representation of a time frame) and an additional graphical tracking element to track user activities fulfilled for user activity conditions. For example, the graphical tracking element can include elements, such as, but not limited to, a color element or a shape element that visually changes to track user activities fulfilled for user activity conditions. In some cases, the base limit progress element depicts a fillable shape with a color-based graphical tracking element that fills the fillable shape with a color when detecting user activities that indicate progress toward fulfilling a user activity condition in a time-based segment.

As further used herein, the term "time-based segment" refers to a period (or frame) of time that corresponds to one or more user activity conditions. For example, a time-based segment can include a frame of time in which one or more user activity conditions are to be fulfilled within to achieve a subsequent base limit value on a user account. In some cases, a time-based segment includes various time frames, such as, but not limited to, months, weeks, days, and/or hours.

Turning now to the figures, FIG. 1 illustrates a block diagram of a system 100 (or system environment) for implementing an inter-network facilitation system 104 and a dynamic base value modeling system 106 in accordance with one or more embodiments. As shown in FIG. 1, the system 100 includes server device(s) 102 (which includes an inter-network facilitation system 104 and the dynamic base value modeling system 106), client device 110, and a network 108. As further illustrated in FIG. 1, the server device(s) 102 and the client device 110 can communicate via the network 108. Although FIG. 1 illustrates the dynamic base value modeling system 106 being implemented by a particular component and/or device within the system 100, the dynamic base value modeling system 106 can be implemented, in whole or in part, by other computing devices and/or components in the system 100 (e.g., the client device 110). Additional description regarding the illustrated computing devices (e.g., the server device(s) 102, the client device 110, and/or the network 108) is provided with respect to FIGS. 16 and 17 below.

As shown in FIG. 1, the server device(s) 102 can include the inter-network facilitation system 104. In some embodiments, the inter-network facilitation system 104 can determine, store, generate, and/or display financial information corresponding to a user account (e.g., a banking application, a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

Indeed, the inter-network facilitation system 104 can include a system that includes the dynamic base value modeling system and that facilitates financial transactions and digital communications across different computing systems over one or more networks. For example, an inter-network facilitation system manages credit accounts, secured accounts, and other accounts for a single account registered within the inter-network facilitation system. In some cases, the inter-network facilitation system is a centralized network system that facilitates access to online banking accounts, credit accounts, and other accounts within a central network location. Indeed, the inter-network facilitation system can link accounts from different network-based financial institutions to provide information regarding, and management tools for, the different accounts.

Furthermore, the dynamic base value modeling system 106 can utilize user activity data (e.g., from a user account corresponding to the client device 110) to generate an activity score. In addition, the dynamic base value modeling system 106 can determine a base limit value, subsequent base limit value, and/or a user activity condition to achieve the subsequent base limit value from a base limit value model. Moreover, the dynamic base value modeling system 106 can generate user interface elements to display the determined base limit value, subsequent base limit value, and user activity condition to achieve the subsequent base limit value from the base limit value model within a display screen of the client device 110 (in accordance with one or more embodiments). For instance, the dynamic base value modeling system 106 can generate and display one or more base limit progress elements that indicate progress towards fulfilling one or more user activity conditions in one or more time-based segments to achieve a subsequent base limit value (within a display screen of the client device 110 in accordance with one or more embodiments).

As also illustrated in FIG. 1, the system 100 includes the client device 110. For example, the client device 110 may include, but is not limited to, a mobile device (e.g., smartphone, tablet) or other type of computing device, including those explained below with reference to FIG. 16. Additionally, the client device 110 can include a computing device associated with (and/or operated by) user accounts for the inter-network facilitation system 104. Moreover, although FIG. 1 illustrates a single client device (e.g., client device 110), the system 100 can include various numbers of client devices that communicate and/or interact with the inter-network facilitation system 104 and/or the dynamic base value modeling system 106.

Furthermore, as shown in FIG. 1, the client device 110 includes a client application 112. The client application 112 can include instructions that (upon execution) cause the client device 110 to perform various actions. For example, as shown in FIG. 1, a user of a user account can interact with the client application 112 on the client device 110 to access financial information, initiate a financial transaction, and/or select (or utilize) a base limit value displayed within the client application 112. In addition, the client application 112 can provide user data activity to the dynamic base value modeling system 106 (via the server device(s) 102) to generate activity scores and/or base limit values for a user account.

In certain instances, the client device 110 corresponds to one or more user accounts (e.g., user accounts stored at the server device(s) 102). For instance, a user of a client device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information, transaction history information, and/or contacts for financial transactions. In some embodiments, a user account can be accessed via multiple devices (e.g., multiple client devices) when authorized and authenticated to access the user account within the multiple devices.

The present disclosure utilizes client devices to refer to devices associated with such user accounts. In referring to a client (or user) device, the disclosure and the claims are not limited to communications with a specific device, but any device corresponding to a user account of a particular user. Accordingly, in using the term client device, this disclosure can refer to any computing device corresponding to a user account of an inter-network facilitation system.

As further shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIG. 16. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

Figure 2A:
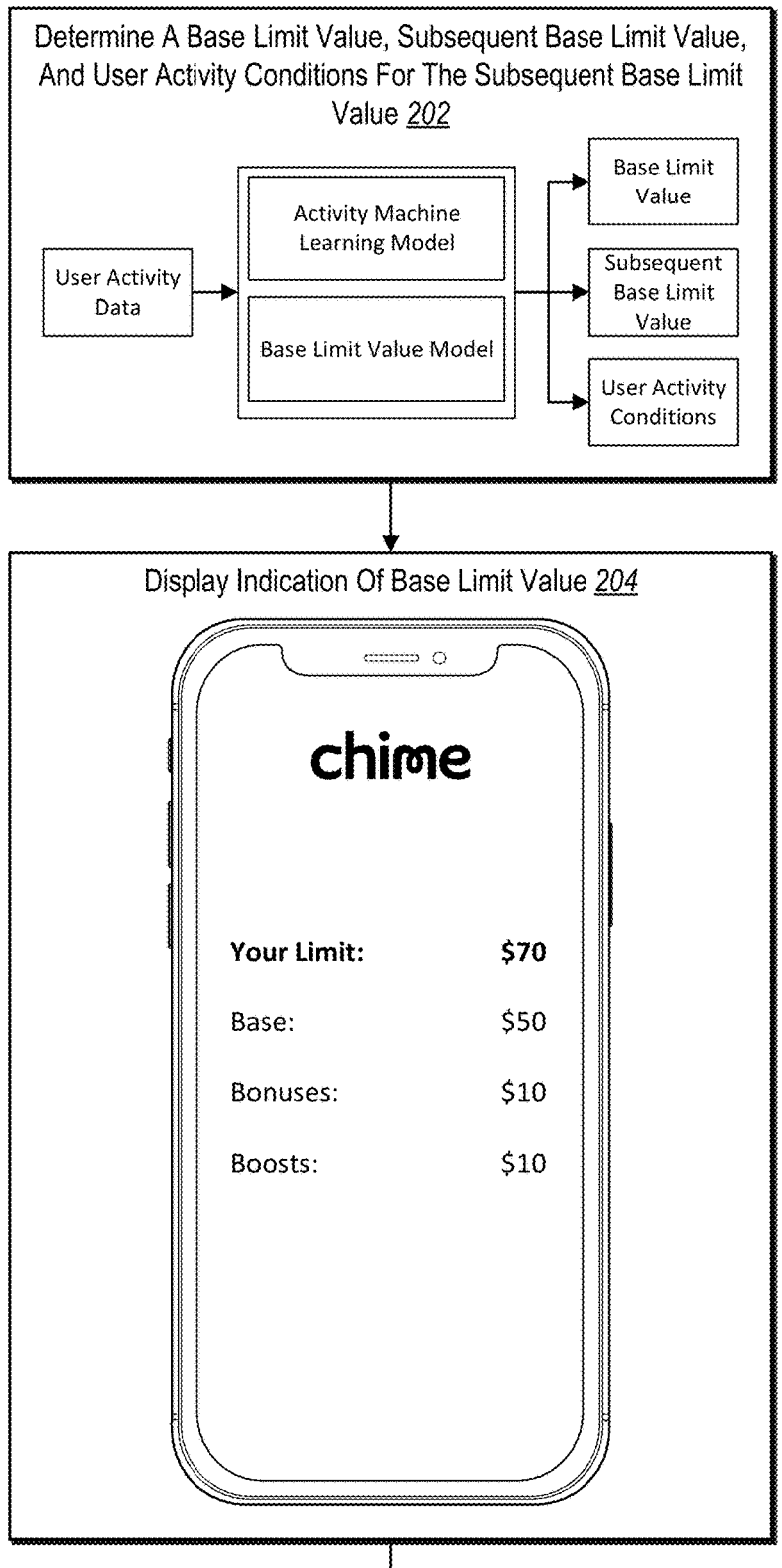
FIGS. 2A-2B illustrate an overview of a dynamic base value modeling system generating user interface elements for a base limit value and a subsequent base limit value in accordance with one or more implementations.
Figure 2B:
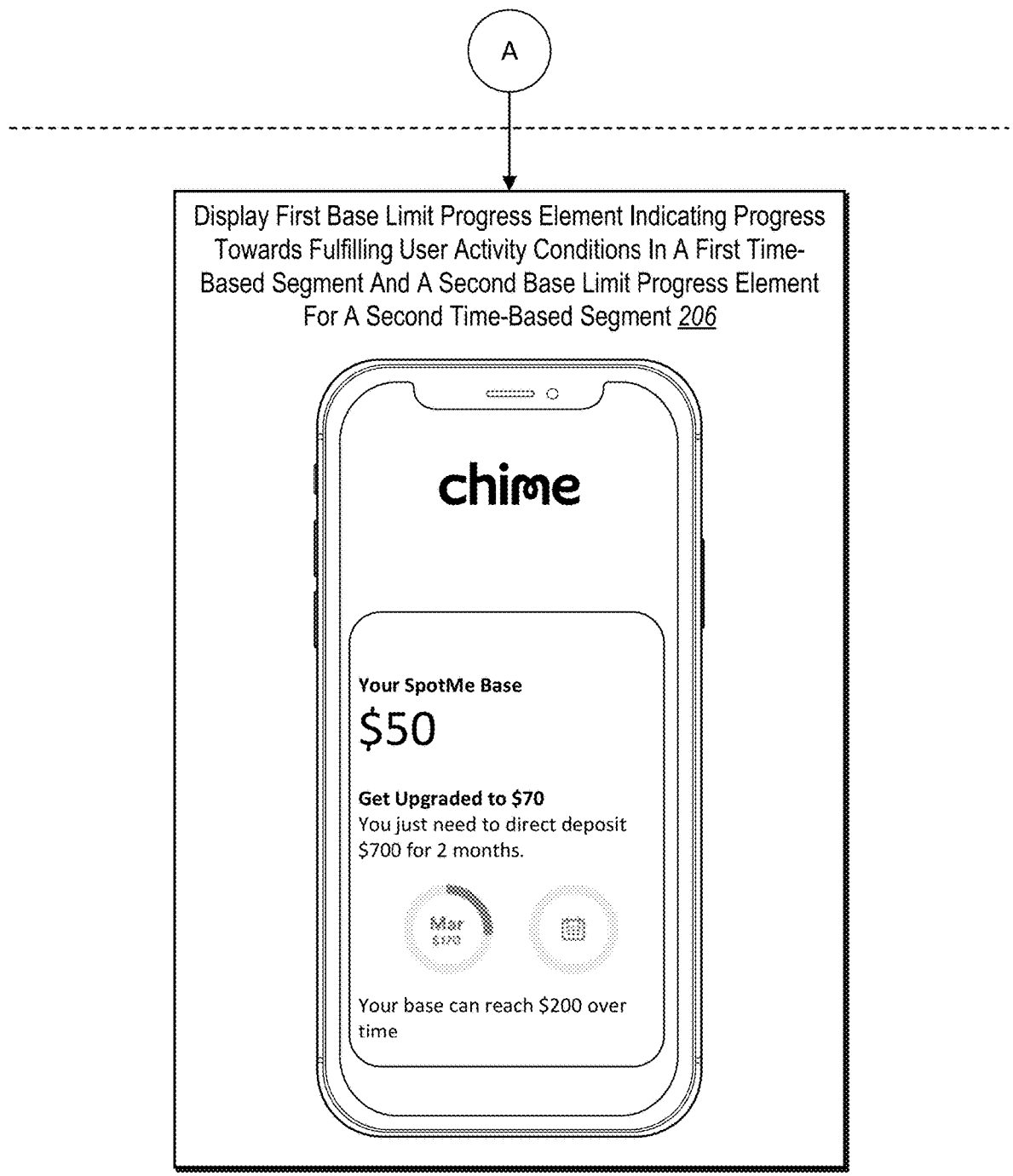

As mentioned above, the dynamic base value modeling system 106 generates user interface elements to transparently and efficiently display determined base limit values for user accounts and conditions that progress the base limit value within a base limit value model. For example, FIGS. 2A-2B illustrate an overview of the dynamic base value modeling system 106 determining a base limit value (and a subsequent base limit value) from a base limit value model. In addition, FIGS. 2A-2B also illustrate an overview of the dynamic base value modeling system 106 displaying the base limit value with insight into the base limit value model (e.g., a subsequent base limit value and user activity conditions to achieve the subsequent base limit value) within a graphical user interface through the display of one or more base limit progress elements.

As shown in act 202 of FIG. 2A, the dynamic base value modeling system 106 determines a base limit value, a subsequent base limit value, and user activity conditions for the subsequent base limit value. In particular, as shown in the act 202 of FIG. 2A, the dynamic base value modeling system 106 utilizes a machine learning model to determine a base limit value, a subsequent base limit value, and user activity conditions for the subsequent base limit value. To illustrate, as shown in the act 202, the dynamic base value modeling system 106 utilizes user activity data with an activity machine learning model and a base limit value model to determine a base limit value, a subsequent base limit value, and user activity conditions for the subsequent base limit value for a user account.

For example, in reference to the act 202 of FIG. 2A, the dynamic base value modeling system 106 can generate an activity score from an activity machine learning model. More specifically, the dynamic base value modeling system 106 can utilize user activity data with an activity machine learning model to generate an activity score. In some embodiments, the dynamic base value modeling system 106 also selects between multiple activity machine learning models based on user activity durations for a user account.

Additional detail regarding the dynamic base value modeling system 106 generating an activity score from an activity machine learning model is described below (e.g., in relation to FIGS. 3 and 4).

Furthermore, in reference to the act 202 of FIG. 2A, the dynamic base value modeling system 106 can utilize a base limit value model to determine a base limit value. For instance, the dynamic base value modeling system 106 can utilize an activity score (and user activity data) with a base limit value model to determine a base limit value. In some instances, the dynamic base value modeling system 106 also can also utilize the activity score (and user activity data) with a base limit value model to determine a subsequent base limit value for a user account. Indeed, the dynamic base value modeling system 106 utilizing a base limit value model to determine base limit values (and/or subsequent base limit values) is described in greater detail below (e.g., in relation to FIGS. 5 and 6).

Moreover, as shown in act 204 of FIG. 2A, the dynamic base value modeling system 106 displays an indication of the determined base limit value within a graphical user interface of a client device. Indeed, as shown in the act 204, the dynamic base value modeling system 106 displays the base limit value for the user account with various information that modifies the base limit value (e.g., bonuses, boosts). In some cases, the dynamic base value modeling system 106 can display various combinations of indicators for the determined base limit value, a determined subsequent base limit value, and/or one or more user activity conditions to achieve the subsequent base limit value.

Moreover, as illustrated in act 206 of FIG. 2B, the dynamic base value modeling system 106 utilizes the determined base limit value (and the subsequent base limit value) to display a first base limit progress element indicating progress towards fulfilling user activity conditions in a first time-based segment and a second base limit progress element for a second time-based segment. For example, as shown in the act 206, the dynamic base value modeling system 106 displays a base limit progress element that indicates (e.g., through a fillable shape) user activities (e.g., deposit values) toward fulfilling a user activity condition (e.g., a deposit transaction goal) within one or more time-based segments (e.g., 2 months). Indeed, the dynamic base value modeling system 106 displaying one or more base limit progress elements is described in greater detail below (e.g., in relation to FIGS. 9A-9B, 10A-10B, 11A-11F, 12, and 13A-13B). Furthermore, the dynamic base value modeling system 106 can also display other user interface elements that indicate the base limit value, the subsequent base limit value, and activity conditions to achieve the subsequent base limit value as described in greater detail below (e.g., in relation to FIGS. 7A, 7B, 8A, and 8B).

As previously mentioned, the dynamic base value modeling system 106 can select an activity machine learning model for a user account based on characteristics of the user account. For example, FIG. 3 illustrates the dynamic base value modeling system 106 selecting between activity machine learning models. In particular, FIG. 3 illustrates the dynamic base value modeling system 106 utilizing a user activity duration to select an activity machine learning model from between multiple activity machine learning models.

Figure 3:
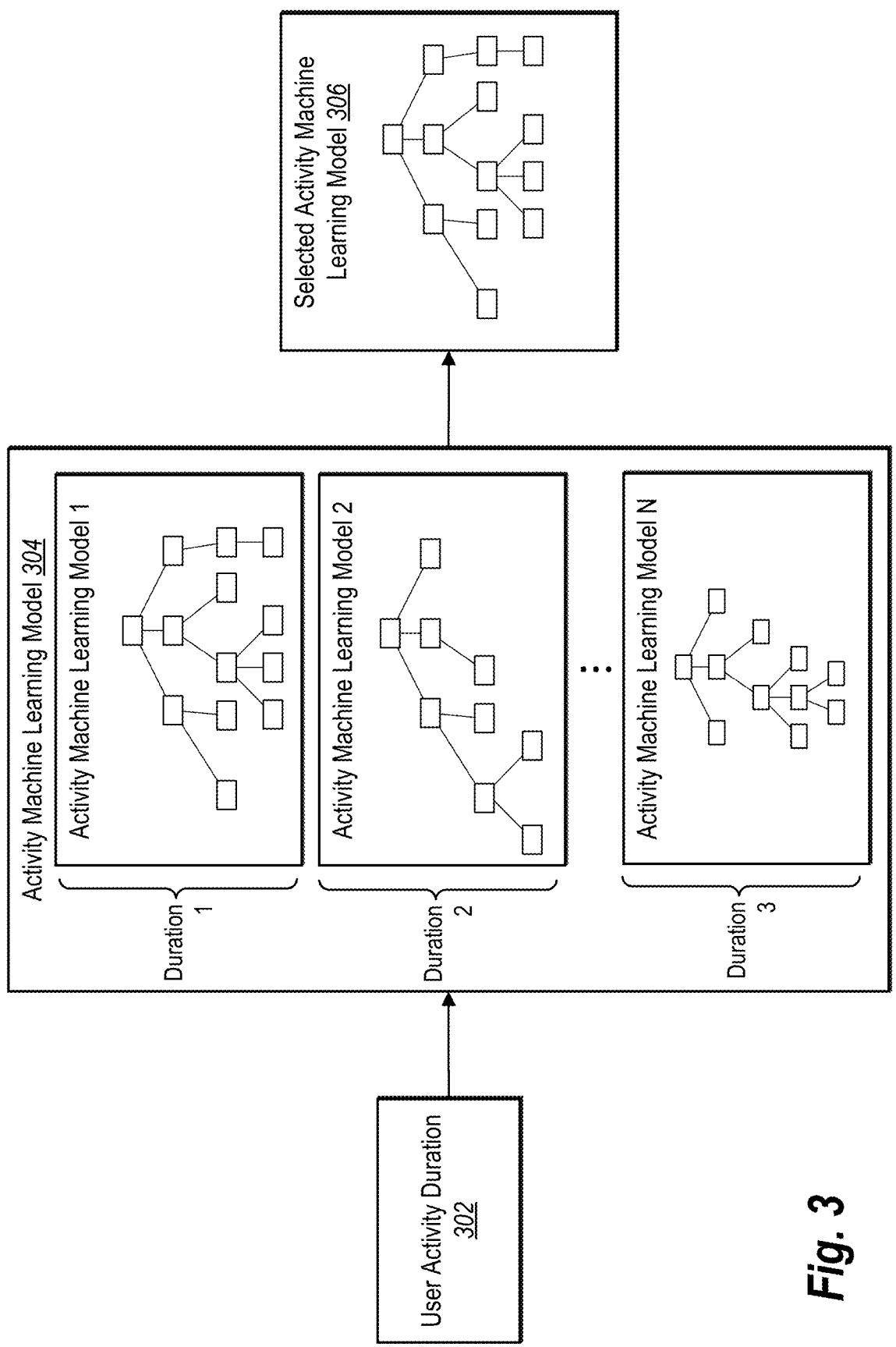
FIG. 3 illustrates a dynamic base value modeling system selecting an activity machine learning model in accordance with one or more implementations.

As shown in FIG. 3, the dynamic base value modeling system 106 identifies a user activity duration 302 for a user account. In some instances, the user activity duration can include a time or duration that the user account has been active (e.g., from a creation of the user account, from an active status of a user account). In one or more embodiments, the dynamic base value modeling system 106 utilizes the user activity duration to indicate an age (or tenure) of a user account. As an example, a user activity duration can include a user account age such as, but not limited to, 3 weeks from account creation, 2 months from account creation, and/or 2 years from account creation.

As further shown in FIG. 3, the dynamic base value modeling system 106 identifies multiple activity machine learning models 304. Furthermore, FIG. 3 illustrates the multiple activity machine learning models corresponding to various user activity durations ranges (e.g., a range of time). In one or more embodiments, the dynamic base value modeling system 106 compares the user activity duration 302 to the user activity duration ranges corresponding to the multiple activity machine learning models 304 to select an activity machine learning model 306.

For example, the dynamic base value modeling system 106 can determine that the user activity duration 302 satisfies a particular user activity duration range corresponding to an activity machine learning model from the multiple activity machine learning models 304. Subsequently, the dynamic base value modeling system 106 can select the activity machine learning model that corresponds to the particular user activity duration range as the activity machine learning model for the user account.

Although one or more embodiments describe the dynamic base value modeling system 106 utilizing a user activity duration to select the activity machine learning model, the dynamic base value modeling system 106 can utilize various types of user account data (or characteristics) to select an activity machine learning model. For example, the dynamic base value modeling system 106 can utilize an activity (or usage) time corresponding to a user account (e.g., the amount of time that a user account is actively online within a client application of the inter-network facilitation system), an account value, an amount of time with a threshold amount of direct deposit value, a number of financial account types, types of financial accounts, and/or other user account characteristics (user age, user authentication security settings, geographic location). Furthermore, although one or more embodiments associates activity machine learning models with user activity duration ranges, the dynamic base value modeling system 106 can associate the activity machine learning models to various types of user account data (or characteristics) with various types of categorical references (e.g., a list or mapping of types, a specific value, a threshold).

Indeed, in one or more embodiments, the dynamic base value modeling system 106 trains each activity machine learning model from the multiple activity machine learning models for a specific set of user accounts (e.g., based on the categorization with the user account data or characteristics such as user activity duration). As an example, the dynamic base value modeling system 106 trains an activity machine learning model to generate an accuracy score for a user account that corresponds to a user activity duration associated with the activity machine learning model. By training the activity machine learning model for user accounts within a user activity duration range, the dynamic base value modeling system 106 generates and selects activity machine learning models that are accurate for a specific grouping of user accounts and the resulting activity scores are more accurate indicators of risk for the specific grouping of user accounts.

As an example, the dynamic base value modeling system 106 can train a first activity machine learning model to generate activity scores for user accounts utilizing a first set of user activity data. Moreover, the dynamic base value modeling system 106 can train a second activity machine learning model to generate activity scores for user accounts utilizing a second set of user activity data. Indeed, the first set of user activity data can include a combination of user activity data variables that are different from the second set of user activity data. By doing so, the dynamic base value modeling system 106 can train activity machine learning models to emphasize user activity data that more effectively determines a risk (or other metric) of user accounts belonging to a group of user accounts in a particular grouping (e.g., based on user activity duration).

In one or more embodiments, the dynamic base value modeling system 106 trains an activity machine learning model utilizing historical user activity data from user accounts. In particular, the dynamic base value modeling system 106 utilizes historical user activity data from a user account to select an activity machine learning model and generate a predicted activity score for the user account. Then, the dynamic base value modeling system 106 can determine a loss function by comparing the predicted activity score to historical behaviors of the user account (as ground truth data). For example, the dynamic base value modeling system 106 can identify the number of times that the user account has paid back a utilized base limit value and/or the number of unpaid utilized base limit values as ground truth data. Then, the dynamic base value modeling system 106 can compare the ground truth data to the generated activity score to calculate a loss that indicates the accuracy of the activity score for the particular user. For example, the dynamic base value modeling system 106 can utilize a loss function such as, but not limited to, an L1 loss, L2 loss, mean square error, classification loss, and/or cross entropy loss.

In some embodiments, the dynamic base value modeling system 106 utilizes third party metric information of user accounts to generate a loss (or determine an accuracy) for a generated activity score from an activity machine learning model. For example, the dynamic base value modeling system 106 can receive (or identify) a fraud (or risk) score for a user account from a third party source as the metric information of the user account. Indeed, a fraud (or risk) score can indicate whether a user account is associated with fraudulent activity and/or negative credit reports. Then, the dynamic base value modeling system 106 can compare the fraud (or risk) score to the activity score generated by the activity machine learning model to determine an accuracy of the activity machine learning model (e.g., a loss function).

Furthermore, the dynamic base value modeling system 106 can utilize a loss value determined from a predicted (or generated) activity score of a user account to train an activity machine learning model. In particular, in one or more embodiments, the dynamic base value modeling system 106 trains an activity machine learning model based on a loss value by adjusting or learning parameters of the activity machine learning model (e.g., back propagation), adjusting weights provided to various user activity data variables, and/or modifying the user activity data variables utilized for the activity machine learning model. In some embodiments, the dynamic base value modeling system 106 adjusts (or modifies) the risk values (or scores) associated with various nodes in an activity score decision tree model based on the loss values.

As mentioned above, the dynamic base value modeling system 106 can generate an activity score for a user account utilizing an activity machine learning model. For example, FIG. 4 illustrates the dynamic base value modeling system 106 generating an activity score utilizing an activity machine learning model with user account activity data of a user account. As shown in FIG. 4, the dynamic base value modeling system 106 utilizes user account activity data 402 with a selected activity machine learning model 404 to generate an activity score. In particular, as shown in FIG. 4, the dynamic base value modeling system 106 utilizes the variables from the user account activity data 402 with a decision tree model of the activity machine learning model 404 to determine an activity score (e.g., the activity score 406) that accurately corresponds to the combination of variable information for the user account activity data 402.

Figure 4:
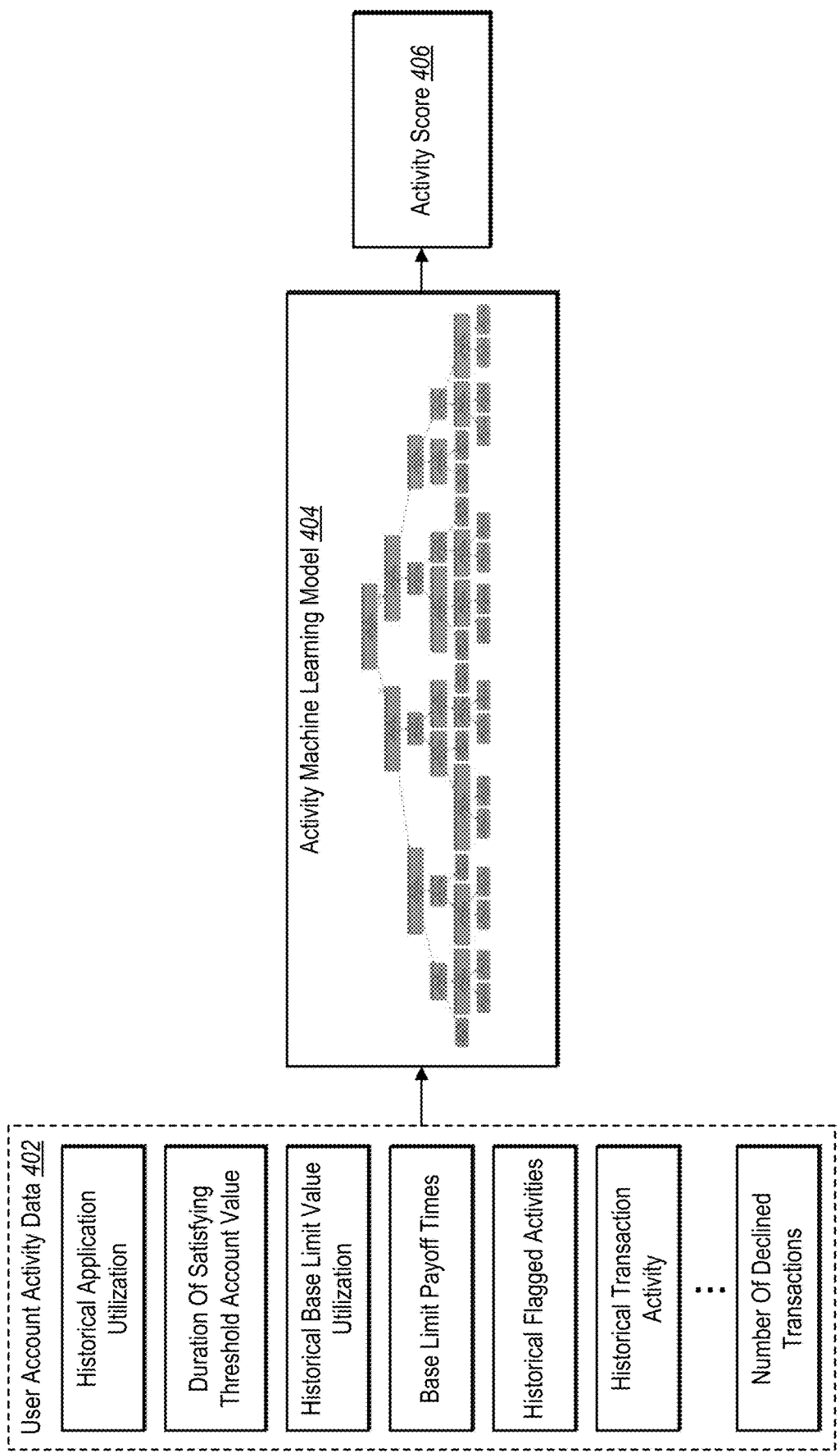
FIG. 4 illustrates a dynamic base value modeling system generating an activity score utilizing an activity machine learning model in accordance with one or more implementations.

As illustrated in FIG. 4, the dynamic base value modeling system 106 can utilize various types of variables for the user account activity data 402. For instance, as shown in FIG. 4, the user account activity data 402 can include historical application utilization, a duration of satisfying a threshold account value, historical base limit value utilization, base limit payoff times, historical flagged activities, historical transaction activities, and/or a number of declined transactions. As an example, the dynamic base value modeling system 106 can utilize historical application utilization data that indicate historical actions of a user account. For example, the historical application utilization data can include, but is not limited to, a number of application logins, application features utilized by a user of a user account, and/or a frequency corresponding to the utilized features.

In addition, the dynamic base value modeling system 106 can utilize a duration of satisfying a threshold account value from a user account. In particular, the duration of satisfying a threshold account value can include an amount of time (e.g., days, months, and/or years) that a user account has maintained an account value (e.g., an account balance) that is equal to or above a particular threshold account value. In addition, the dynamic base value modeling system 106 can utilize a historical base limit value utilization. In one or more embodiments, the dynamic base value modeling system 106 can utilize the historical base limit value utilization to indicate the amount, frequency, and times (e.g., dates, times of day) that a user account has utilized a provided base limit value. Additionally, the dynamic base value modeling system 106 can utilize base limit payoff times from a user account that indicates times (e.g., dates, times of day) of transactions that pay a utilized base limit value amount within a user account.

Furthermore, the dynamic base value modeling system 106 can utilize historical flagged activities as user account activity data for an activity machine learning model. As an example, a historical flagged activity can include flags (or notes) corresponding to a user account that indicates various identified activities of the user account such as, but not limited to, a flag indicating fraudulent activity, a flag indicating historical bans and/or blacklists of a user account, and/or previous penalties associated with a user account. In addition, the historical flagged activities can include third party reports on a user account that identifies (or indicates) fraudulent, malicious, and/or other security related activities or actions taken by a user of the user account.

Additionally, the dynamic base value modeling system 106 can also utilize historical transaction activities as user account activity data. In some embodiments, the dynamic base value modeling system 106 identifies previous transactions with merchants, services, persons, and/or other users of the inter-network facilitation system as historical transaction activities. In certain instances, the dynamic base value modeling system 106 utilizes a transaction type (e.g., utilities, shopping, travel, fitness) associated with the transaction as part of the historical transaction activity. In some cases, the dynamic base value modeling system 106 utilizes various combinations of at least the timing corresponding to the historical transaction activity (e.g., dates, time of days, time), the recipient or sender of the transactions, and/or transaction amounts as part of historical transaction activities. In addition, the dynamic base value modeling system 106 can also utilize a number of declined transactions as user account activity data. For example, the dynamic base value modeling system 106 a number of declined transactions to indicate a number of times a user account has had a declined transaction (e.g., due to insufficient funds, fraud alerts).

Although one or more embodiments describe the dynamic base value modeling system 106 utilizing particular types of user account activity data, the dynamic base value modeling system 106 can utilize various user account activity data variables within an activity machine learning model to generate an activity score. In particular, the dynamic base value modeling system 106 can utilize numerous variables (e.g., hundreds, thousands) corresponding to various categories such as, but not limited to, activity logs of a user account sessions, user account balances, user account transactions, user account income and/or occupation information, geographic location information, financial products (e.g., credit cards, loans) associated with the user account, contact information associated with a user account (e.g., phone numbers, email addresses), user account spending and/or transaction behaviors.

As mentioned above, the dynamic base value modeling system 106 can train multiple activity machine learning models to accurately generate activity scores for a specific category of user accounts. Indeed, the dynamic base value modeling system 106 can train an activity machine learning model to emphasize (or function) for a specific set of user account activity data variables. In particular, the dynamic base value modeling system 106 can determine a set of user account activity data variables to utilize for a particular activity machine learning model (e.g., based on a duration of activity from a user account or other characteristic of a user account). In some cases, the dynamic base value modeling system 106 can provide (or assign) weights to particular user account activity data variables based on the duration of activity from a user account or other characteristic of a user account (e.g., for the selected activity machine learning model).

As shown in FIG. 4, the dynamic base value modeling system 106 utilizes an activity score decision tree as the activity machine learning model. In one or more embodiments, the dynamic base value modeling system 106 utilizes an activity machine learning model comprising an activity score decision tree that includes various user account activity data variables that branch based on the user account activity data satisfying (or not satisfying) the thresholds generated for the various user account activity data variables. Then, based on satisfying (or not satisfying) the thresholds corresponding to the user account activity data variables, the dynamic base value modeling system 106 can determine the effect the branching user account activity data variables contributes to a risk score (or value) of a user account (e.g., in terms of a risk percentage).

To illustrate, the dynamic base value modeling system 106 can utilize an activity score decision tree to determine whether data of a user account (e.g., activity data) satisfies a threshold for a first node of the decision tree. Based on whether the user account satisfies the threshold for the first node, the dynamic base value modeling system 106 can track a risk score for the user account and further traverse to subsequent nodes to check other user activity data variables. Indeed, at each node of the decision tree, the dynamic base value modeling system 106 can adjust the risk score of the user account based on whether the user account activity data satisfies the thresholds for the user activity data variable at the particular node.

As an example, at a first node of the decision tree, the dynamic base value modeling system 106 can identify whether an account balance of a user account has been above a threshold balance amount for a threshold number of days. In some instances, upon determining that the account balance of the user account does satisfy the threshold balance amount and the threshold number of days, the dynamic base value modeling system 106 can subsequently traverse to a node of the activity score decision tree that does not increase the risk score of the user account. On the other hand, upon determining that the account balance of the user account does not satisfy the threshold balance for the threshold number of days, the dynamic base value modeling system 106 can subsequently traverse to a node of the activity score decision tree that increases the risk score of the user account. In addition, the dynamic base value modeling system 106 can further analyze another user activity data variable at the subsequent nodes to further determine increases (and/or decreases) in a risk score for the user account.

In one or more embodiments, the dynamic base value modeling system 106 outputs an activity score that indicates a numerical value within a predetermined range based on the risk score (or another value) of the decision tree of the activity machine learning model. For instance, the dynamic base value modeling system 106 can utilize an activity score value between zero and six. In particular, the dynamic base value modeling system 106 can utilize the activity score value of zero to six to indicate varying risk levels corresponding to the user account (e.g., via a risk score from the activity score decision tree). For instance, an activity score of zero can be associated with a high risk level (e.g., a high risk percentage) and an activity score of six can be associated with a low risk level (or vice versa). Indeed, the activity score can indicate a risk level of a user account failing to repay a utilized base limit value (or failing to reinstate an account balance amount that satisfies the base limit value).

In some embodiments, the activity score can be various numerical values (e.g., zero to nine) and/or other types of data to indicate a category (or magnitude) of risk of a user account. For example, the activity score can include an alphabetical grade, a percentage, class, and/or a label. In addition, although one or more embodiments describe the dynamic base value modeling system 106 generating an activity score from a risk value determined within a decision tree of the activity machine learning model, the dynamic base value modeling system 106 can utilize the decision tree of the activity machine learning model to generate various metrics. For instance, the dynamic base value modeling system 106 can utilize the activity machine learning model to generate metrics such as, but not limited to, an interest (or satisfaction) value of a user account, a conversion probability for the user account, a loyalty of the user account, a user activity condition tier for the user account, and/or a risk segment for the user account.

For instance, although one or more embodiments describe the dynamic base value modeling system 106 utilizing machine learning models to generate (or predict) an activity score for a user account, the dynamic base value modeling system 106 can also utilize machine learning models to determine user activity condition tiers (e.g., a deposit transaction activity tier) for the user account as a metric. To illustrate, the dynamic base value modeling system 106 can utilize user account activity data with an activity machine learning model to determine a user activity condition tier for a user account. In some cases, the user activity condition tier includes a deposit transaction activity tier for a user account that associates the user account with a range of deposit transaction activity amounts (e.g., $0 to $300, $301 to $700, $701 to $1200). In one or more embodiments, the dynamic base value modeling system 106 utilizes a determined user activity condition tier for a user account to determine an activity score (e.g., determining a higher activity score as a user accounts user activity condition tier rises).

Furthermore, although one or more embodiments describe the dynamic base value modeling system 106 utilizing machine learning models to generate (or predict) an activity score for a user account, in some implementations, the dynamic base value modeling system 106 can also utilize machine learning models to determine risk segments for the user account as a metric. In particular, the dynamic base value modeling system 106 can utilize user account activity data with an activity machine learning model to determine a risk segment for a user account. Indeed, in some instances, the risk segment indicates a categorized likelihood of a user account failing to pay a base limit value amount utilized by the user account (i.e., risk level). For instance, the dynamic base value modeling system 106 can utilize the user account activity data with an activity machine learning model to determine risk segments, such as, but not limited to, low risk, medium risk, and/or high risk for a user account. In some implementations, the dynamic base value modeling system 106 utilizes a determined activity score (from the activity machine learning model) for a user account to determine a risk segment for the user account (e.g., determining a lower risk segment as the activity score for the user account increases).

In addition, although one or more embodiments describe the dynamic base value modeling system 106 utilizing an activity score decision tree model, the dynamic base value modeling system 106 can utilize various machine learning models to generate (or predict) an activity score for a user account. For example, the dynamic base value modeling system 106 can utilize a classification neural network to classify a user account into an activity score (or activity score grouping) based on one or more user activity data variables. In some instances, the dynamic base value modeling system 106 can utilize a regression-based and/or clustering-based machine learning models to determine an activity score for a user account based on one or more user activity data variables.

Moreover, in one or more embodiments, the dynamic base value modeling system 106 can determine activity scores using activity machine learning models as described in U.S. application Ser. No. 17/519,129 filed Nov. 4, 2021, entitled GENERATING USER INTERFACES COMPRISING DYNAMIC BASE LIMIT VALUE USER INTERFACE ELEMENTS DETERMINED FROM A BASE LIMIT VALUE MODEL (hereinafter "application Ser. No. 17/519,129"), the contents of which are herein incorporated by reference in their entirety.

Figure 5:
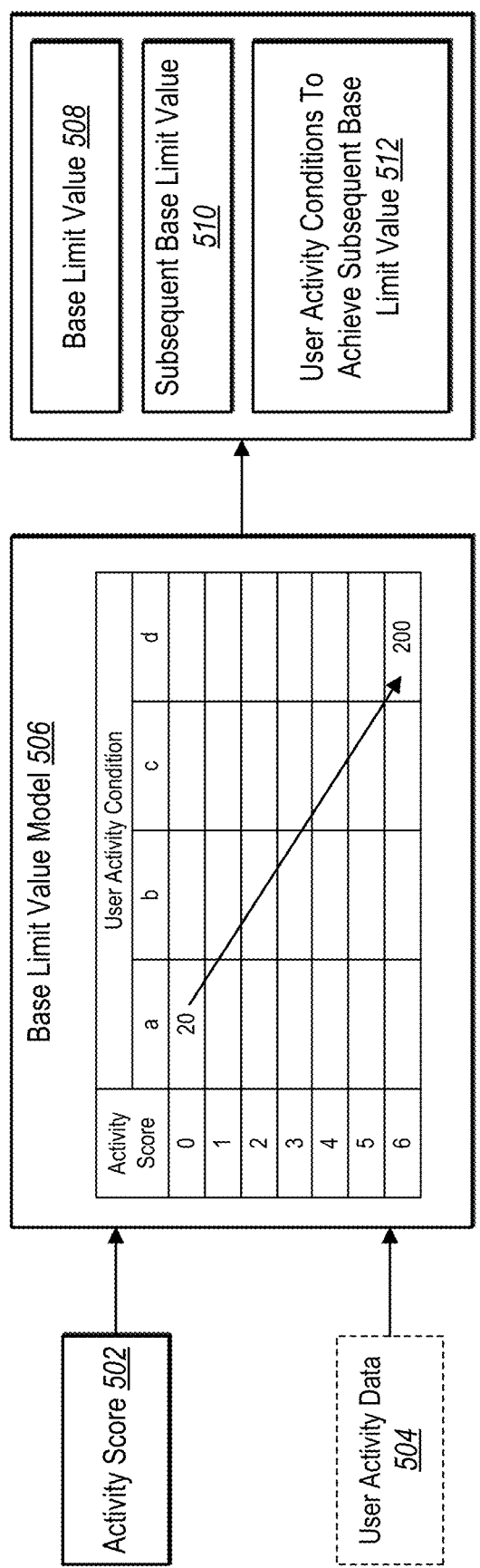
FIG. 5 illustrates a dynamic base value modeling system determining a base limit value utilizing a base limit value matrix in accordance with one or more implementations.

As previously mentioned, the dynamic base value modeling system 106 can determine a base limit value from an activity score utilizing a base limit value model. For example, FIG. 5 illustrates the dynamic base value modeling system 106 utilizing a base limit value matrix as the base limit value model to determine a base limit value for a user account. Indeed, FIG. 5 illustrates the dynamic base value modeling system 106 utilizing an activity score generated for a user account with a base limit value matrix to determine a base limit value.

As shown in FIG. 5, the dynamic base value modeling system 106 utilizes an activity score 502 (and user activity data 504) to determine a base limit value from a base limit value model 506 (e.g., a base limit value matrix). As shown in FIG. 5, the dynamic base value modeling system 106 can reference the base limit value model 506 to identify a base limit value that maps to the activity score 502. As an example, for an activity score of zero (e.g., a high risk user account), the dynamic base value modeling system 106 can determine a base limit value from a section of the base limit value model 506 that corresponds to the activity score of zero within the matrix.

In addition, as shown in FIG. 5, the dynamic base value modeling system 106 can also utilize the user activity data 504. In particular, the dynamic base value modeling system 106 can reference the base limit value model 506 to identify a base limit value that maps to the activity score 502 and a user activity condition. For instance, the user activity condition can include a conditional action that triggers a mapping to a base limit value under the section of the base limit value model 506 for the user activity condition. To illustrate, upon determining that the activity score 502 is six and the user activity data 504 triggers (or maps) to the user activity condition "d," the dynamic base value modeling system 106 can determine a base limit value of 200. As shown in FIG. 5, the dynamic base value modeling system 106 can determine a base limit value 508, a subsequent base limit value 510, and user activity conditions to achieve the subsequent base limit value 512 from the base limit value model 506.

In some embodiments, the dynamic base value modeling system 106 can utilize an account deposit amount as the user activity condition within the base limit value model 506. For example, the user activity condition can include a deposit transaction activity of a particular deposit amount. Moreover, in one or more embodiments, the dynamic base value modeling system 106 can determine from the user activity data 504 a deposit transaction activity of the user account (e.g., a deposit transaction activity of 2000 dollars). Then, upon determining that the activity score 502 is six and the user activity data 504 triggers (or maps) to the user activity condition "d" when the condition is a deposit transaction of 2000 dollars, the dynamic base value modeling system 106 can determine a base limit value of 200 for the user account.

Although one or more embodiments describes a deposit transaction activity as the user activity condition, the dynamic base value modeling system 106 can utilize various user activity data for the user activity condition. For instance, the user activity condition within a base limit value matrix can include a frequency of a deposit transaction, a user-to-user transaction activity, and/or a spending transaction activity. Indeed, the dynamic base value modeling system 106 can map user activity data and activity score from a user account to a base limit value matrix to determine a base limit value for the user account.

Although one or more embodiments herein illustrate the dynamic base value modeling system 106 utilizing user activity conditions and activity scores as variables within a base limit value model (e.g., base limit value matrix) to determine a base limit value for a user account, in one or more embodiments, the dynamic base value modeling system 106 can utilize various dimensions of variables in the base limit value model (e.g., base limit value matrix). For instance, in some cases, the dynamic base value modeling system 106 can utilize a base limit value matrix that represents relationships (or mappings) between user activity condition tiers, activity scores, and particular risk segments of a user account. Indeed, the dynamic base value modeling system 106 can input activity condition tiers, activity scores, and particular risk segments corresponding to a user account within the base limit value model (e.g., base limit value matrix) to select (or output) a base limit value for the user account.

In addition, the dynamic base value modeling system 106 can also determine a subsequent base limit value for a user account from a base limit value matrix. For example, the dynamic base value modeling system 106 can determine the next incremental step (or change) in base limit values in relation to a determined base limit value from a base limit value matrix as the subsequent base limit value. For instance, the dynamic base value modeling system 106 can determine that when a base limit value is 20 and, within the same activity score, the next achievable base limit value that is an element in the base limit value matrix is 30, the dynamic base value modeling system 106 can determine that the subsequent base limit value is 30.

Moreover, the dynamic base value modeling system 106 can also determine one or more user activity conditions within the base limit value matrix to achieve the subsequent base limit value. For instance, the dynamic base value modeling system 106 can identify from the base limit value matrix, the user activity condition that changes the determined base limit value to the subsequent base limit value. As an example, in reference to FIG. 5, the dynamic base value modeling system 106 can determine that in order to move from a base limit value of 20 to the subsequent base limit value (e.g., 30), the user account needs to satisfy the user activity condition "b" from the user activity condition "a." Accordingly, the dynamic base value modeling system 106 can determine and provide that the user activity condition "b" achieves the subsequent base limit value for the user account.

Figure 6:
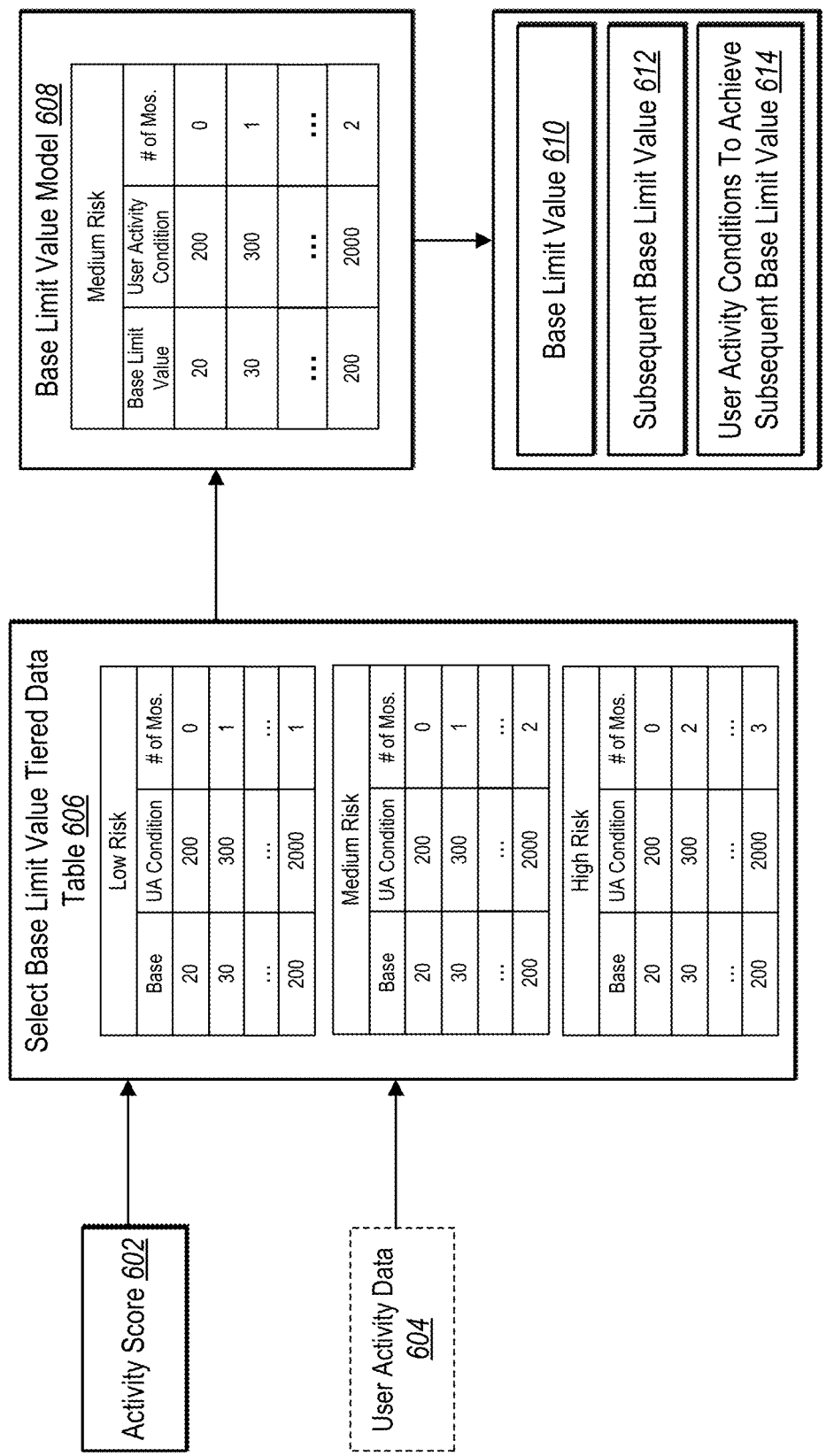
FIG. 6 illustrates a dynamic base value modeling system determining a base limit value utilizing a base limit value tiered data table in accordance with one or more implementations.

As mentioned above, in one or more embodiments, the dynamic base value modeling system 106 utilizes a base limit value tiered data table as a base limit value model to determine a base limit value for a user account. For instance, FIG. 6 illustrates the dynamic base value modeling system 106 utilizing a base limit value tiered data table to determine a base limit value for a user account. As shown in FIG. 6, the dynamic base value modeling system 106 can select a base limit value tiered data table from multiple base limit value tiered data tables and then utilize the selected base limit value tiered data table to identify a base limit value, a subsequent base limit value, and one or more user activity conditions to achieve the subsequent base limit value.

For instance, in an act 606 of FIG. 6, the dynamic base value modeling system 106 selects a base limit value tiered data table from multiple base limit value tiered data tables utilizing an activity score 602 (and/or user activity data 604). In particular, as shown in FIG. 6, each base limit value tiered data table corresponds to a varying risk category or risk segment (e.g., low risk, medium risk, and high risk). As mentioned above, the dynamic base value modeling system 106 can utilize the activity score 602 to determine a risk category (or segment) for a user account (e.g., a first range of activity scores can correspond to a low risk level and a second range of activity scores can correspond to a high risk level). In some instances, the dynamic base value modeling system 106 selects the base limit value tiered data table (in the act 606 of FIG. 6) that matches with to a risk level of an activity score (e.g., activity score 602) generated for a user account. As shown in FIG. 6, the dynamic base value modeling system 106 selects the base limit value tiered data table for the medium risk level as the base limit value model 608.

As further illustrated in FIG. 6, the base limit value model 608 (e.g., a base limit value tiered data table) includes base limit values and user activity conditions to progress to a subsequent tier of the base limit value. For example, as shown in FIG. 6, the dynamic base value modeling system 106 can determine a base limit value 610 based on the user activity data 604. For example, the dynamic base value modeling system 106 can determine a base limit value of 20 when the user activity data 604 indicates that a user account has satisfied the user activity condition (e.g., a deposit transaction of 200) for at least zero months. Furthermore, the dynamic base value modeling system 106 can determine a base limit value of 30 for the user account when the user activity data 604 indicates that the user account has satisfied the user activity condition of a deposit transaction of 300 for at least one month. In addition, as also shown in FIG. 6, the dynamic base value modeling system 106 can determine a base limit value of 200 for the user account when the user activity data 604 indicates that the user account has satisfied the user activity condition of a deposit transaction of 2000 dollars for at least two months (after satisfying the previous user activity conditions in the base limit value tiered data table).

In some embodiments, the dynamic base value modeling system 106 can directly determine a higher base limit value (e.g., 200). For instance, the dynamic base value modeling system 106 can identify that the user account activity data of a user account indicates that a user activity condition of a deposit transaction for the higher base limit value has been performed by the user account for a number of months having a sum that totals the number of months in the base limit value tiered data table from the lowest base limit value to the determined base limit value. Accordingly, the dynamic base value modeling system 106, in some embodiments, directly assigns the higher base limit value to a user account having such user activity data.

In addition, as shown in FIG. 6, the dynamic base value modeling system 106 can also determine a subsequent base limit value 612 from the base limit value model 608 (e.g., a base limit value tiered data table). In reference to the base limit value model 608 of FIG. 6 (representing a base limit value tiered data table), the dynamic base value modeling system 106 can select a next tier base limit value from a determined base limit value as the subsequent base limit value. For instance, in a base limit value tiered data table, the dynamic base value modeling system 106 can select the next base limit value on the next tier (e.g., on the next row of a tiered data table) as the subsequent base limit value. As an example, in the base limit value model 608 of FIG. 6, the dynamic base value modeling system 106 can determine that 30 is the subsequent base limit value when the determined base limit value for a user account is 20.

Furthermore, as illustrated in FIG. 6, the dynamic base value modeling system 106 can also determine one or more user activity conditions to achieve a subsequent base limit value 614 from the base limit value model 608 (e.g., a base limit value tiered data table). For example, the dynamic base value modeling system 106 can select the user activity conditions corresponding to the subsequent base limit value tier in the tiered data table as the user activity conditions that achieve the subsequent base limit value. For example, in the base limit value model 608 of FIG. 6, the dynamic base value modeling system 106 can determine that a user activity condition of a deposit transaction of 300 for one month to achieve a subsequent base limit value of 30 when the determined base limit value for a user account is 20.

In one or more embodiments, the dynamic base value modeling system 106 generates each base limit value tiered data table from a set of base limit value tiered data tables to be configured for a set of user accounts based on activity scores. In particular, the dynamic base value modeling system 106 can associate a first base limit value tiered data table to a first activity score by selecting (or generating) values for the first base limit value tiered data table to reflect a risk level represented by the first activity score (e.g., user activity conditions that are less stringent based on a low risk level associated with a user account). In addition, the dynamic base value modeling system 106 can associate a second base limit value tiered data table to a second activity score by selecting (or generating) values for the second base limit value tiered data table to reflect a risk level represented by the second activity score (e.g., user activity conditions that are more stringent based on a high risk level associated with a user account).

Although one or more embodiments illustrate the dynamic base value modeling system 106 categorizing base limit value tiered data tables based on risk levels, the dynamic base value modeling system 106 can utilize various metrics from various types of activity scores to categorize and/or select base limit value tiered data tables. For example, the dynamic base value modeling system 106 can utilize metrics such as, but not limited to, an interest (or satisfaction) value of a user account, a conversion probability for the user account, and/or a loyalty of the user account to categorize (and/or configure) base limit value tiered data tables. In addition, the dynamic base value modeling system 106 can utilize an activity score that corresponds to the various metrics to select a base limit value tiered data table in accordance with one or more embodiments herein.

Additionally, although one or more embodiments describes a deposit transaction activity as the user activity condition for the base limit value tiered data tables, the dynamic base value modeling system 106 can utilize various user activity data for the user activity condition in the base limit value tiered data tables. For example, the user activity condition within a base limit value tiered data table can include a user-to-user transaction activity and/or a spending transaction activity. In addition, the base limit value tiered data table can include various combinations of the user activity conditions such as, but not limited to, a user-to-user transaction activity and a number of times the user-to-user transaction activity occurs and/or a spending transaction activity frequency and a value amount of the spending transaction activities.

In one or more embodiments, the values associated with a base limit value model (e.g., a base limit value matrix and/or a base limit value tiered data table) can be generated (or populated) utilizing a machine learning model. As an example, the dynamic base value modeling system 106 can train a machine learning model (e.g., a decision tree model, a regression model, a classification model) to determine (or predict) base limit values for varying activity scores and/or user activity conditions (e.g., mappings that are likely to result in a non-default success rate that satisfies a threshold non-default success rate). Then, the dynamic base value modeling system 106 can utilize the machine learning model to generate a base limit value model by populating data values of the base limit value model based on the determined base limit values and predicted mappings to user activity conditions and/or activity scores.

In some embodiments, the values corresponding to the base limit value model can be configured and/or modified by an administrator user on an administrator device. For instance, the dynamic base value modeling system 106 can receive a selection and/or input value for a particular value or element within the base limit value model. Then, the dynamic base value modeling system 106 can utilize the selection and/or input to modify a base limit value, activity score, and/or a user activity condition within the base limit value model. As an example, the dynamic base value modeling system 106 can receive a user interaction from an administrator device to modify the base limit value associated with a user activity condition of a deposit transaction of 300 from a base limit value of 30 to 35.

Although one or more embodiments describes the dynamic base value modeling system 106 utilizing a base limit value model and activity score (from the activity machine learning model) to determine base limit values, the dynamic base value modeling system 106 an utilize the base limit value model and activity score to determine various types of values for a user account. For instance, the dynamic base value modeling system 106 can determine a lending credit value (and subsequent lending credit value) for a user account in accordance with one or more embodiments herein. In some embodiments, the dynamic base value modeling system 106 can determine a credit line (and subsequent credit line) for a user account in accordance with one or more embodiments herein. Furthermore, the dynamic base value modeling system 106 can also determine a transfer limit (and subsequent transfer limit) for a user account in accordance with one or more embodiments herein.

Additionally, in one or more embodiments, the dynamic base value modeling system 106 can determine base limit values using base limit value models (e.g., base limit matrices and/or base limit value tiered data tables) as described in U.S. application Ser. No. 17/519,129, the contents of which are herein incorporated by reference in their entirety.

As previously mentioned, the dynamic base value modeling system 106 can generate and display user interface elements to transparently and efficiently present base limit values, subsequent base limit values, and user activity conditions to achieve the subsequent base limit values from a base limit value model. For instance, FIG. 7A illustrates the dynamic base value modeling system 106 generating and displaying a graphical user interface that displays a determined base limit value for a user account. Furthermore, FIG. 7B illustrates the dynamic base value modeling system 106 generating and displaying a graphical user interface that displays the base limit value, a subsequent base limit value, and user activity conditions to achieve the subsequent base limit value from a base limit value model.

As shown in FIG. 7A, the dynamic base value modeling system 106 provides for display, within a graphical user interface 704 of a client device 702, a user interface element 706 that displays a total value limit corresponding to a user account that accounts for a base limit value and various modifiers to the base limit value. Indeed, as shown in FIG. 7A, the dynamic base value modeling system 106 provides for display, within the graphical user interface 704, a user interface element 708 that displays a base limit value determined from a base limit value model. In addition, the dynamic base value modeling system 106 also provides for display, within the graphical user interface 704, user interface elements 710 and 712 that modify the base limit value and also provide an explanation for the modification to the base limit value (e.g., a temporary modifier to the base limit value). Indeed, as illustrated in FIG. 7A, the dynamic base value modeling system 106 provides for display, within the graphical user interface 704, user interface elements that indicate that a user account has available an excess utilization buffer balance of 70 dollars in which the determined base limit value is 50 dollars and 20 dollars of modifiers based on actions taken on the user account.

In addition, as shown in FIG. 7A, the dynamic base value modeling system 106 provides for display, within the graphical user interface 704, a selectable user interface element 714 that indicates a user account activity that can increase the excess utilization buffer balance indicated in the user interface element 706. For example, upon receiving a user interaction with the selectable user interface element 714 and completion of the action corresponding to the selectable user interface element 714, the dynamic base value modeling system 106 can (temporarily) increase the excess utilization buffer balance indicated in the user interface element 706. For example, the action corresponding to the selectable user interface element 714 can include, but is not limited to, a share action, a transaction activity, a deposit transaction activity, and/or an account creation activity.

Figure 7B:
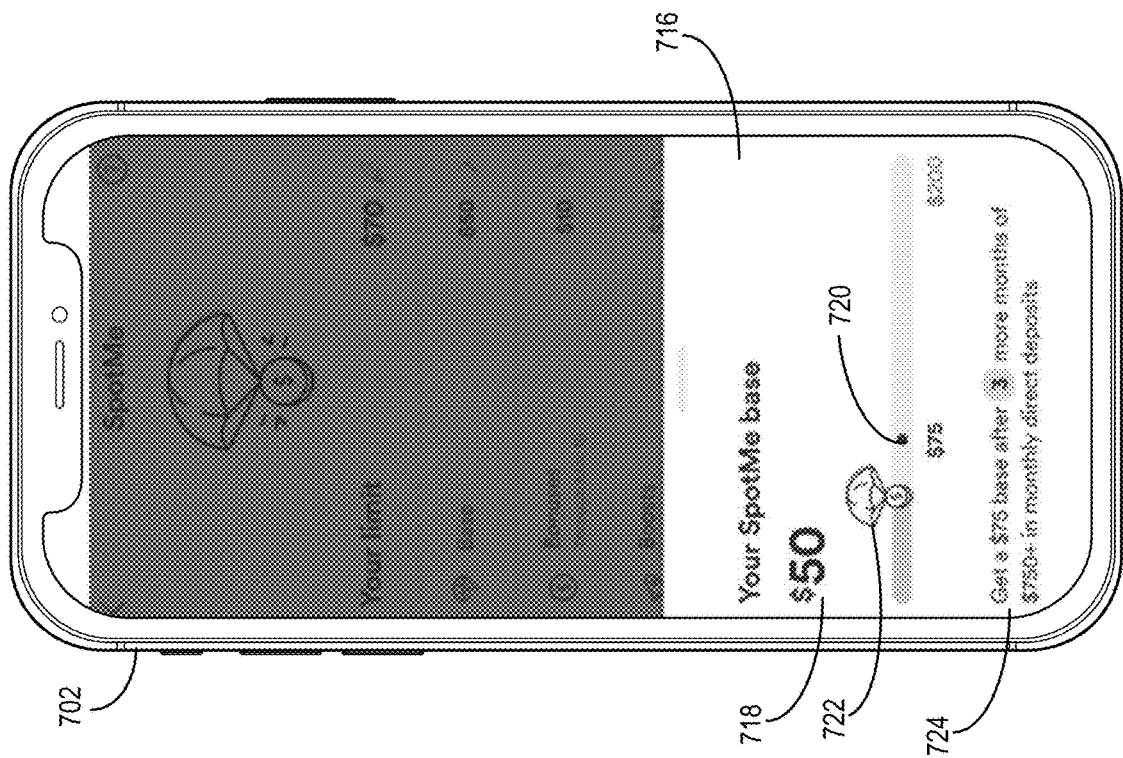
FIGS. 7A and 7B illustrate a dynamic base value modeling system generating user interface elements to display a base limit value, a subsequent base limit value, and a user activity condition to achieve a subsequent base limit value in accordance with one or more implementations.
Figure 7A:
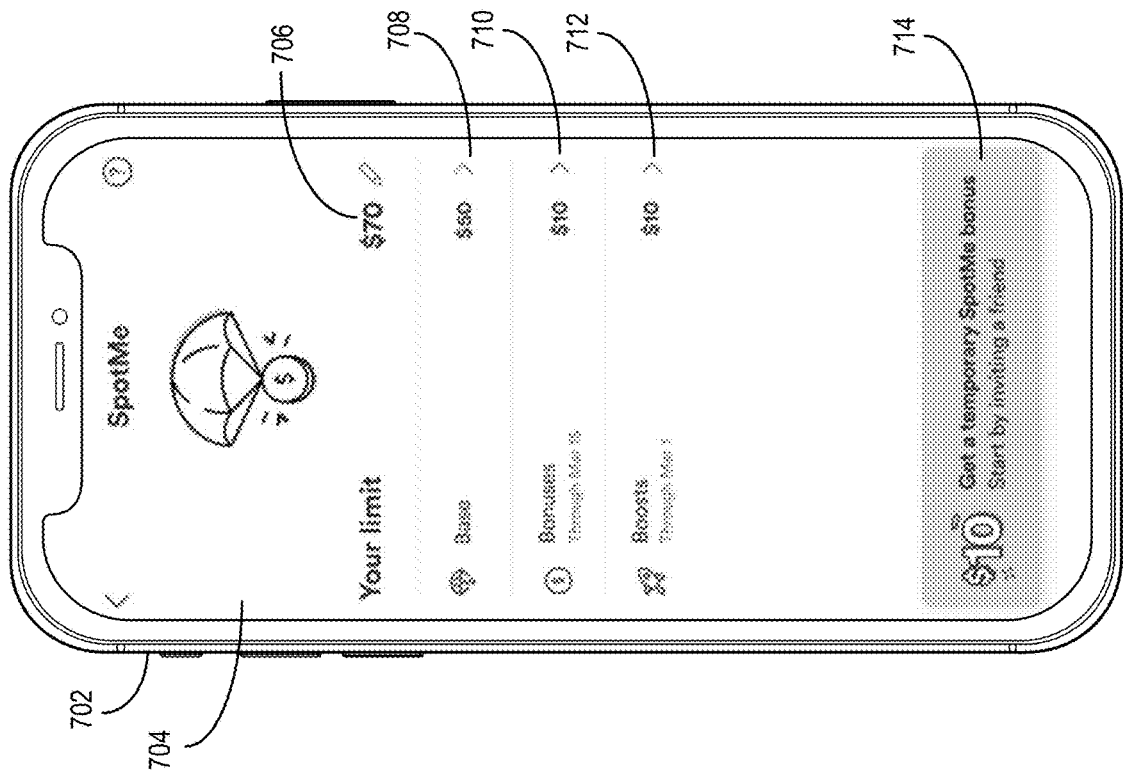

In addition, upon receiving a selection of the user interface element 708 within the graphical user interface 704 (as shown in FIG. 7A), the dynamic base value modeling system 106 provides for display, within a graphical user interface 716 of the client device 702 (as shown in FIG. 7B), information corresponding to the base limit value determined for the user account corresponding to the client device 702. For instance, as shown in FIG. 7B, the dynamic base value modeling system 106 provides for display, within the graphical user interface 716, the base limit value 718. Furthermore, as also illustrated in FIG. 7B, the dynamic base value modeling system 106 provides for display, within the graphical user interface 716, a user interface element 720 that indicates a subsequent base limit value for the user account.

In addition, as shown in FIG. 7B, the dynamic base value modeling system 106 provides for display, within the graphical user interface 716, a user interface element 724 that indicates user activity conditions to achieve the subsequent base limit value (from the user interface element 720). Indeed, the user interface element 724 indicates an amount of a user activity condition of a deposit transaction (e.g., $750 or more) and a frequency of the deposit transaction (e.g., 3 more months) to achieve the subsequent base limit value (from the user interface element 720). In addition, as shown in FIG. 7B, the dynamic base value modeling system 106 provides for display, within the graphical user interface 716, a user interface element 722 that displays a tracked progress of the user account to the subsequent base limit value. In one or more embodiments, the dynamic base value modeling system 106 updates the location of the user interface element 722 upon identifying updated user activity data for the user account.

Figure 8B:
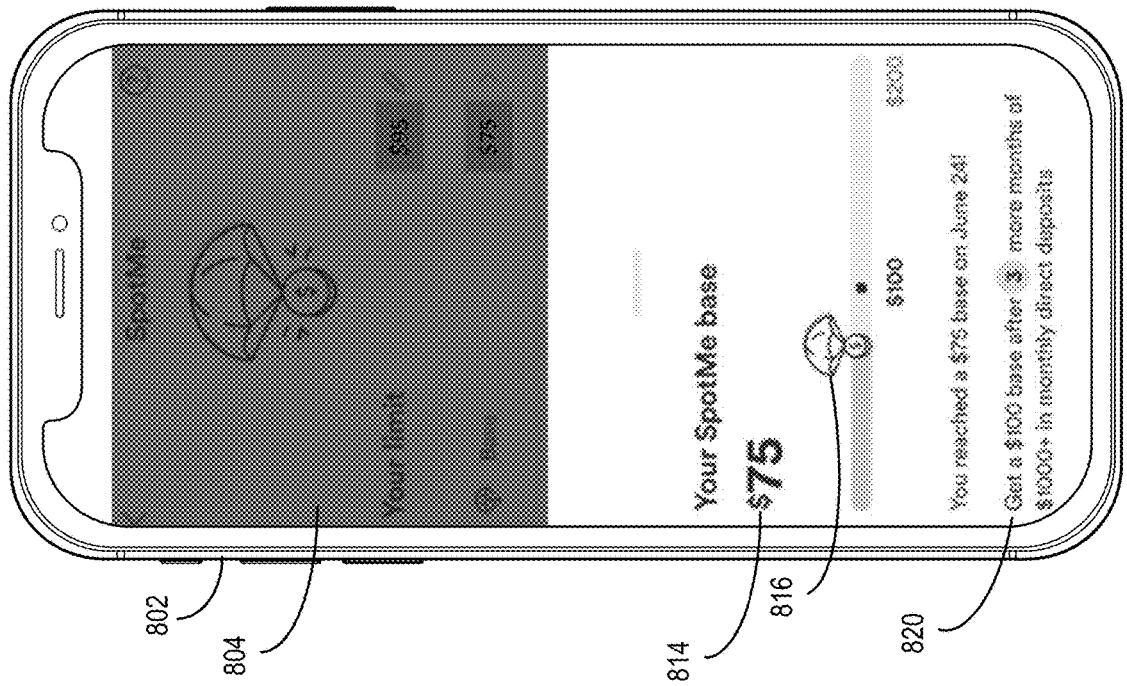
FIGS. 8A and 8B illustrate a dynamic base value modeling system generating updated user interface elements upon detecting updates to user activity data in accordance with one or more implementations.
Figure 8A:
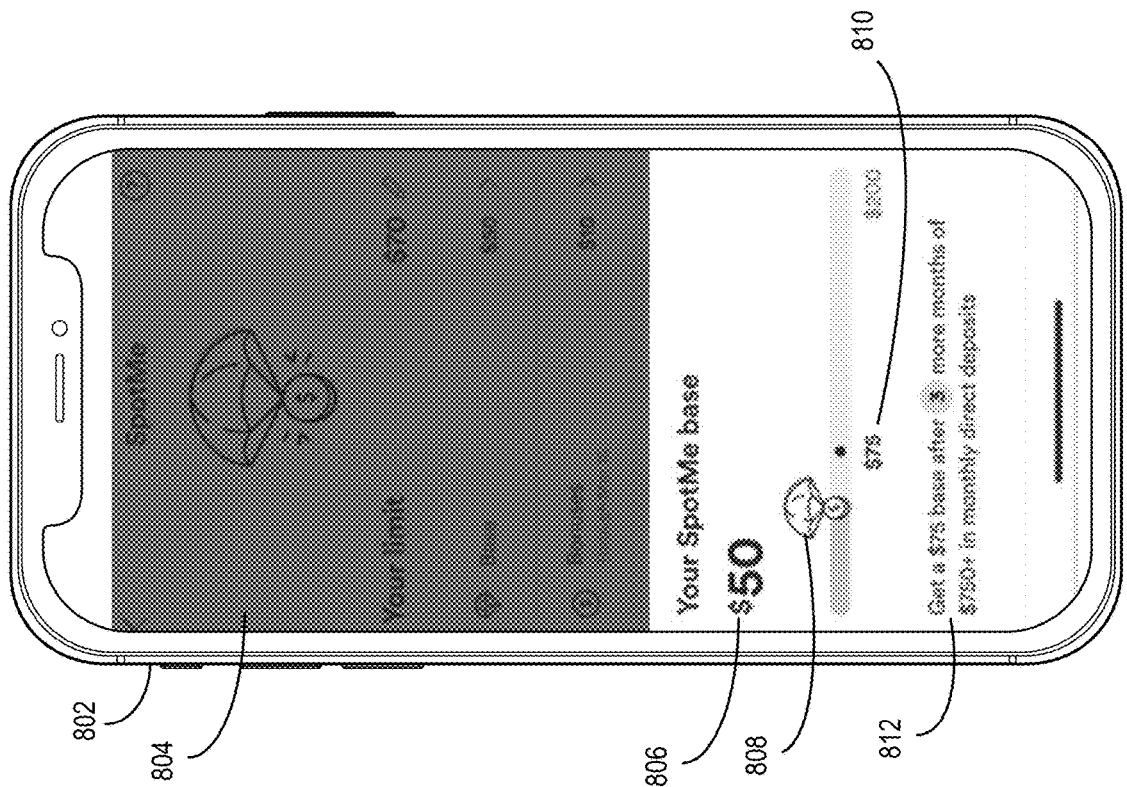

As mentioned above, the dynamic base value modeling system 106 can modify user interface elements upon identifying updated user activity data corresponding to a user account. For instance, FIGS. 8A and 8B illustrate the dynamic base value modeling system 106 modifying user interface elements. As shown in FIG. 8A, the dynamic base value modeling system 106 provides for display, within a graphical user interface 804 of a client device 802, a user interface element 806 for a base limit value, a user interface element 810 for a subsequent base limit value, a user interface element 812 for user activity conditions to achieve the subsequent base limit value, and a user interface element 808 to track progress towards the subsequent base limit value.

Upon identifying updated user activity data corresponding to the user account corresponding to the client device 802, the dynamic base value modeling system 106 can determine updated user activity conditions and modify the user interface elements to display the updated user activity conditions. For example, as shown by the transition from FIG. 8A to FIG. 8B, the dynamic base value modeling system 106 provides for display, within the graphical user interface 804 of the client device 802, an updated user interface element 814 to indicate an updated base limit value determined from the updated user activity data. For example, the dynamic base value modeling system 106 can determine that the user account satisfied the previous user activity condition and, as a result, assign the previously indicated subsequent base limit value as the base limit value.

Moreover, as shown by the transition from FIG. 8A to FIG. 8B, the dynamic base value modeling system 106 provides, for display within the graphical user interface 804, the updated user interface element 816 that is moved to track progress of the increase in the base limit value (e.g., from 50 dollars to 75 dollars). Additionally, as shown in FIG. 8B, the dynamic base value modeling system 106 provides, for display within the graphical user interface 804, an updated user interface element 820 to indicate an updated user activity condition (e.g., a deposit transaction of 1000 dollars for 3 more months) to achieve a subsequent base limit value (e.g., 100 dollars).

Furthermore, in one or more embodiments, the dynamic base value modeling system 106 can generate and display user interface elements to transparently and efficiently present base limit values, subsequent base limit values, and user activity conditions to achieve the subsequent base limit values from a base limit value model as described in U.S. application Ser. No. 17/519,129, the contents of which are herein incorporated by reference in their entirety.

As previously mentioned, the dynamic base value modeling system 106 can display, within a graphical user interface, a base limit progress element that indicates progress towards fulfilling the user activity conditions to achieve the subsequent base limit value. For example, FIGS. 9A and 9B illustrate the dynamic base value modeling system 106 generating and displaying a base limit progress element to indicate progress towards fulfilling one or more user activity conditions to achieve a subsequent base limit value from a determined base limit value for a user account.

Figure 9B:
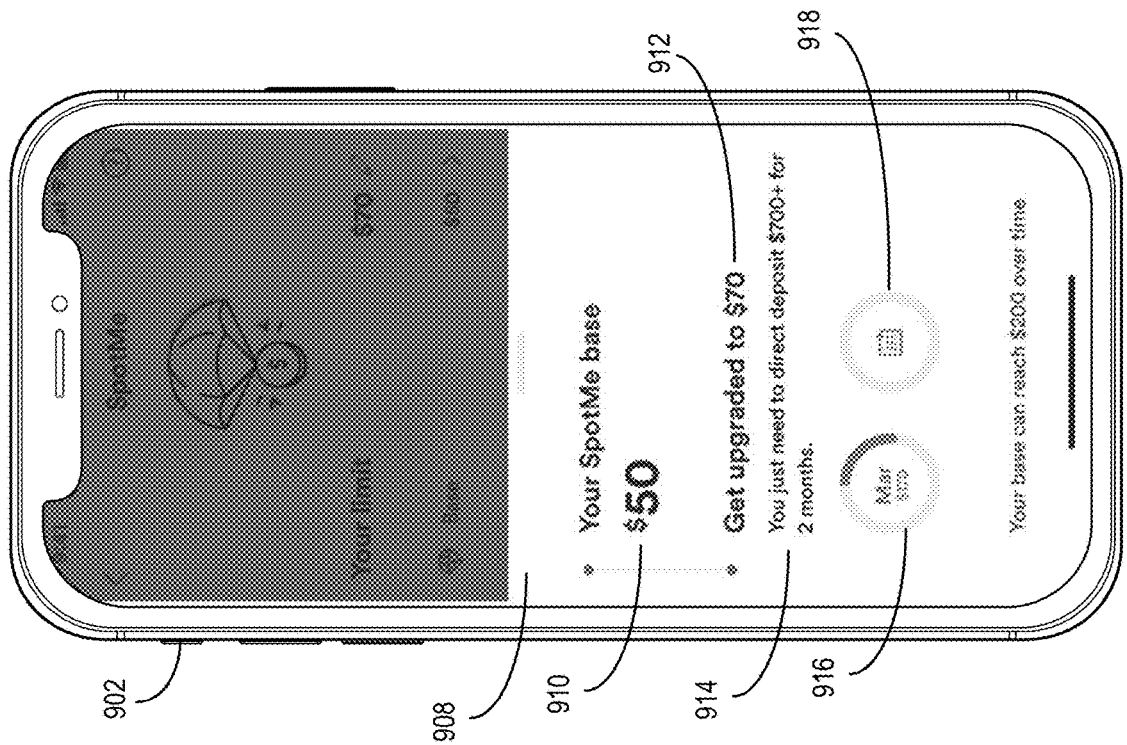
FIGS. 9A and 9B illustrate a dynamic base value modeling system displaying a base limit progress element in accordance with one or more implementations.
Figure 9A:
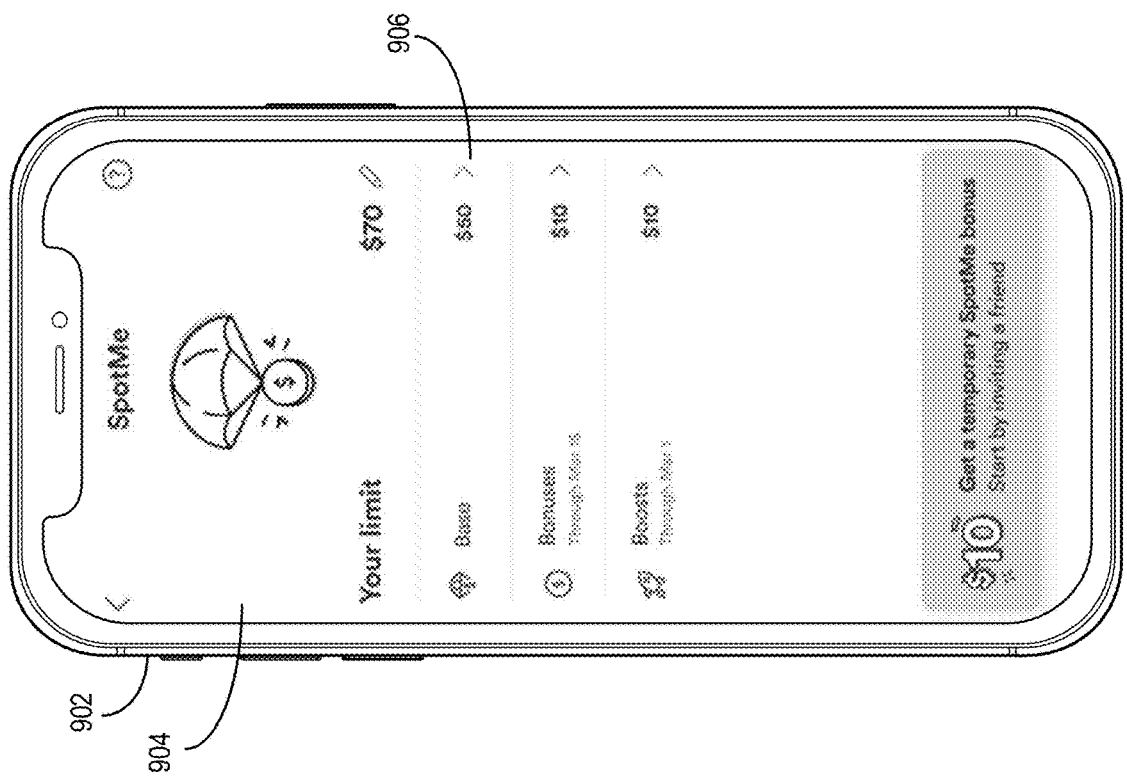

For instance, as shown in FIG. 9A, the dynamic base value modeling system 106 provides for display, within the graphical user interface 904 of a client device 902, a user interface element 906 that displays a base limit value determined from a base limit value model (e.g., as described above). Furthermore, upon receiving a selection of the user interface element 906 within the graphical user interface 904 (as shown in FIG. 9A), the dynamic base value modeling system 106 provides for display, within a graphical user interface 908 (e.g., a slider window) of the client device 902 (as shown in FIG. 9B), information corresponding to the base limit value, a subsequent base limit value, and one or more activity conditions to achieve the subsequent base limit value. In particular, the dynamic base value modeling system 106 provides for display, within the graphical user interface 908, multiple base limit progress elements that indicate progress towards fulfilling the user activity conditions to achieve the subsequent base limit value.

For example, as shown in FIG. 9B, the dynamic base value modeling system 106 provides for display, within the graphical user interface 908, information corresponding to the base limit value determined for the user account corresponding to the client device 902. For instance, as shown in FIG. 9B, the dynamic base value modeling system 106 provides for display, within the graphical user interface 908, the base limit value 910. Moreover, as illustrated in FIG. 9B, the dynamic base value modeling system 106 provides for display, within the graphical user interface 908, a user interface element 912 that indicates a subsequent base limit value for the user account. In addition, as shown in FIG. 9B, the dynamic base value modeling system 106 provides for display, within the graphical user interface 908, a user interface element 914 that indicates user activity conditions to achieve the subsequent base limit value (from the user interface element 912). For example, the user interface element 914 indicates an amount of a user activity condition of a deposit transaction (e.g., $700 or more) and a frequency of the deposit transaction (e.g., 2 more months) to achieve the subsequent base limit value (from the user interface element 912).

As further shown in FIG. 9B, the dynamic base value modeling system 106 displays, within the graphical user interface 908, a first base limit progress element 916 for a first time-based segment (e.g., a month). Indeed, as shown in FIG. 9B, the dynamic base value modeling system 106 determines an amount of progress toward the previously determined user activity condition. For example, the dynamic base value modeling system 106 monitors accounts corresponding to a particular user to determine that the account has received a direct deposit of $170 in the month of March. In response, the dynamic base value modeling system 106 displays the first base limit progress element 916 to indicate user activity progress (e.g., deposits of $170) to fulfill a user activity condition within a first time-based segment (e.g., the month of March). As illustrated in FIG. 9B, the dynamic base value modeling system 106 displays the first base limit progress element 916 as a fillable shape (e.g., a circle) that updates to fill the shape of the first base limit progress element 916 as user activities are detected by the dynamic base value modeling system 106. For example, as $170 is approximately one fourth of the user activity condition of $700 deposits, the dynamic base value modeling system 106 tracks/compares progress relative to satisfying the user activity condition by displaying the first base limit progress element 916 filled by approximately one fourth of the entire fillable shape using color (e.g., partially filled and/or complete). Upon receiving additional user activity, the dynamic base value modeling system 106 can display the first base limit progress element 916 with additional filled-in portions (to indicate further progress towards satisfying the user activity condition).

Additionally, as shown in FIG. 9B, the dynamic base value modeling system 106 further displays, via the graphical user interface 908, an additional (second) base limit progress element 918. As shown in FIG. 9B, the dynamic base value modeling system 106 displays, within the graphical user interface 908, the second base limit progress element 918 indicating no progress towards user activity conditions within a subsequent time-based segment. Furthermore, as illustrated in FIG. 9B, the dynamic base value modeling system 106 displays the second base limit progress element 918 with an unspecified time-based segment (e.g., to enable tracking of non-consecutive time frames to achieve a subsequent base limit value).

Although one or more embodiments illustrates the dynamic base value modeling system 106 displaying base value limit progress elements as fillable circular shapes, the dynamic base value modeling system 106 can display base value limit progress elements using various combinations of shapes and/or styling to track progress towards fulfilling one or more user activity conditions to achieve a subsequent base limit value. For example, the dynamic base value modeling system 106 can display the base value limit progress element in shapes, such as, but not limited to, squares, triangles, rectangles, ovals, and/or another object (e.g., rocket, parachute, coin). Furthermore, the dynamic base value modeling system 106 can display a fillable element using styling, such as, but not limited to, changing a color of a border of the shape, gradually changing a color of the shape, and/or filling the shape with a different color.

Figure 10B:
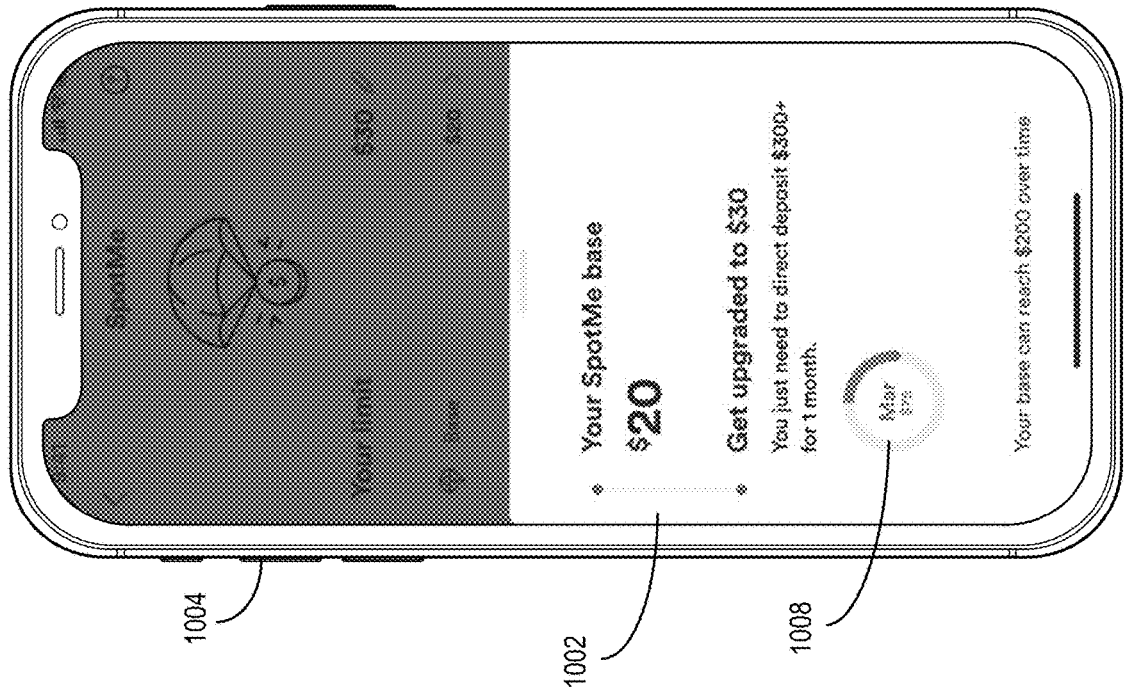
FIGS. 10A and 10B illustrate a dynamic base value modeling system displaying a single base limit progress element for a single time-based segment in accordance with one or more implementations.
Figure 10A:
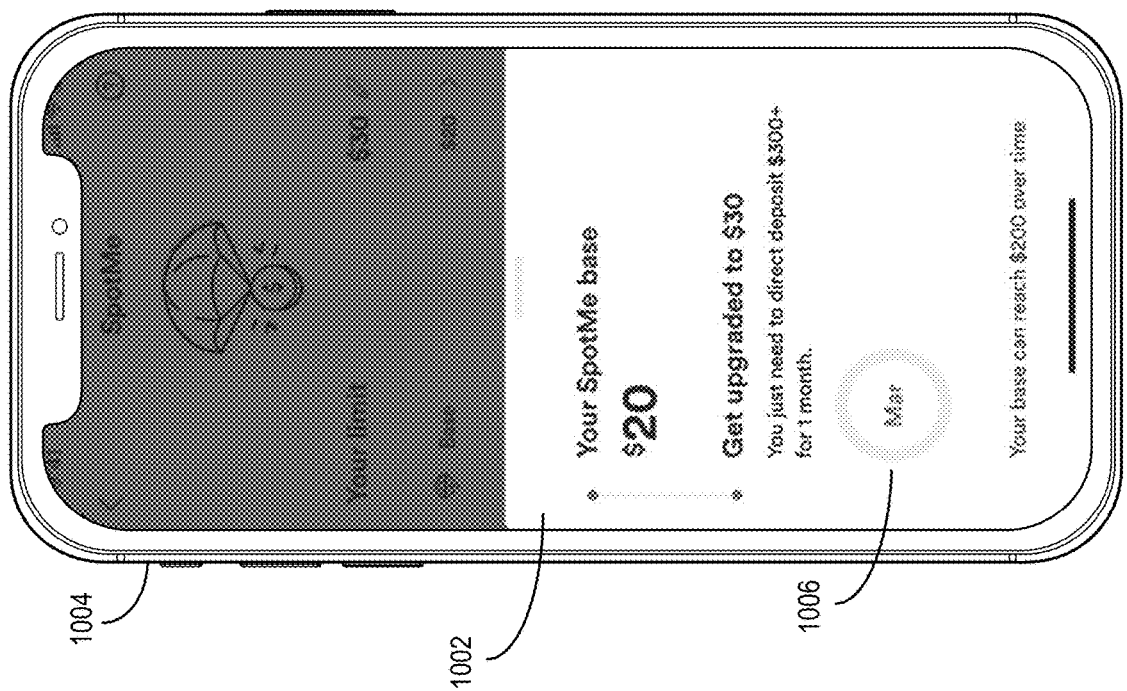

In some instances, the dynamic base value modeling system 106 generates a single base limit progress element for a single time-based segment. For example, FIGS. 10A-10B illustrate the dynamic base value modeling system 106 displaying a single base limit progress element for a single time-based segment. Indeed, as shown in FIG. 10A, the dynamic base value modeling system 106 provides, for display within a graphical user interface 1002 of a client device 1004, a base limit progress element 1006. As further shown in FIG. 10A, the dynamic base value modeling system 106 displays the base limit progress element 1006 with no progress in the time-based segment (e.g., no indication of user activity in the month of March through the absence of a fillable element).

As shown in the transition from FIG. 10A to FIG. 10B, the dynamic base value modeling system 106 provides, for display within the graphical user interface 1002 of the client device 1004, an updated base limit progress element 1008 upon receiving one or more user activities from a user account corresponding to the client device 1004 towards the user activity conditions to achieve the subsequent base limit value (in the time-based segment) (e.g., determining one or more user activities occurring during the time-based segment). For example, as shown in FIG. 10B, the dynamic base value modeling system 106 provides, for display within the graphical user interface 1002 of the client device 1004, the updated base limit progress element 1008 to indicate partial progress towards fulfillment of the one or more user activity conditions in the time-based segment. As illustrated in FIG. 10B, the dynamic base value modeling system 106 indicates the partial progress by displaying the updated base limit progress element 1008 with a partially filled color (and also an indication of the one or more user activities in the time-based segment (e.g., a deposit amount from the user account in the month of March).

In some cases, in reference to FIGS. 10A and 10B, the dynamic base value modeling system 106 can receive (or identify) one or more user activities corresponding to the user account that satisfies the user activity conditions to achieve the subsequent base limit value in the time-based segment. Upon satisfaction of the user activity conditions, the dynamic base value modeling system 106 can display the base limit progress element to depict completion of the user activity conditions corresponding to the time-based segment (e.g., via filling the entire border or entirety of the circular shape or other shape with a color element). In addition, the dynamic base value modeling system 106 can also, upon satisfaction of the user activity conditions in the time-based segment, increase the base limit value to the subsequent base limit value for the user account.

Figure 11A:
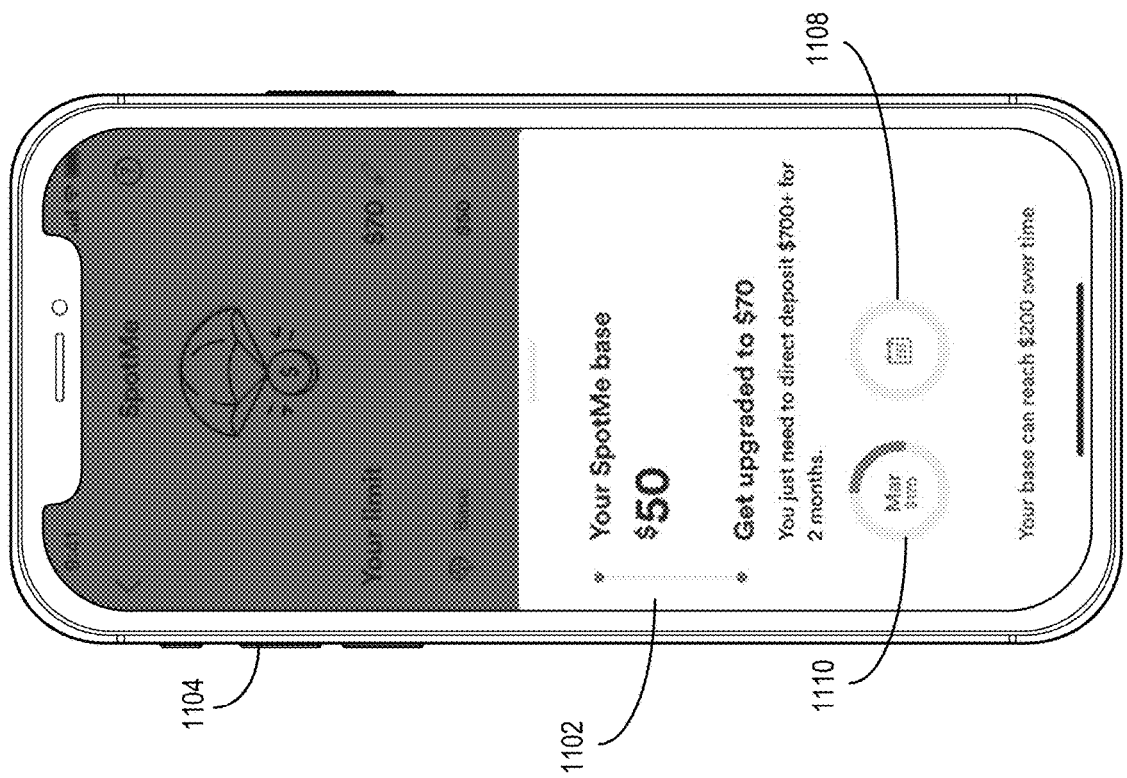
FIGS. 11A-11F illustrate a dynamic base value modeling system displaying a graphical user interface in which multiple base limit progress elements track user activities to achieve a subsequent base limit value in accordance with one or more implementations.

Furthermore, FIGS. 11A-11F illustrate an exemplary graphical user interface in which the dynamic base value modeling system 106 displays multiple base limit progress elements for user activity conditions in multiple time-based segments to achieve a subsequent base limit value. For instance, as shown in FIG. 11A, the dynamic base value modeling system 106 provides, for display within a graphical user interface 1102 in a client device 1104, a first base limit progress element 1106 for a first time-based segment (e.g., with no progress in the month of March). In addition, as shown in FIG. 11A, the dynamic base value modeling system 106 provides, for display within the graphical user interface 1102 in the client device 1104, a second base limit progress element 1108 without a designated time-based segment (e.g., an unspecified time or time segment) and depicting no progress.

Figure 11B:
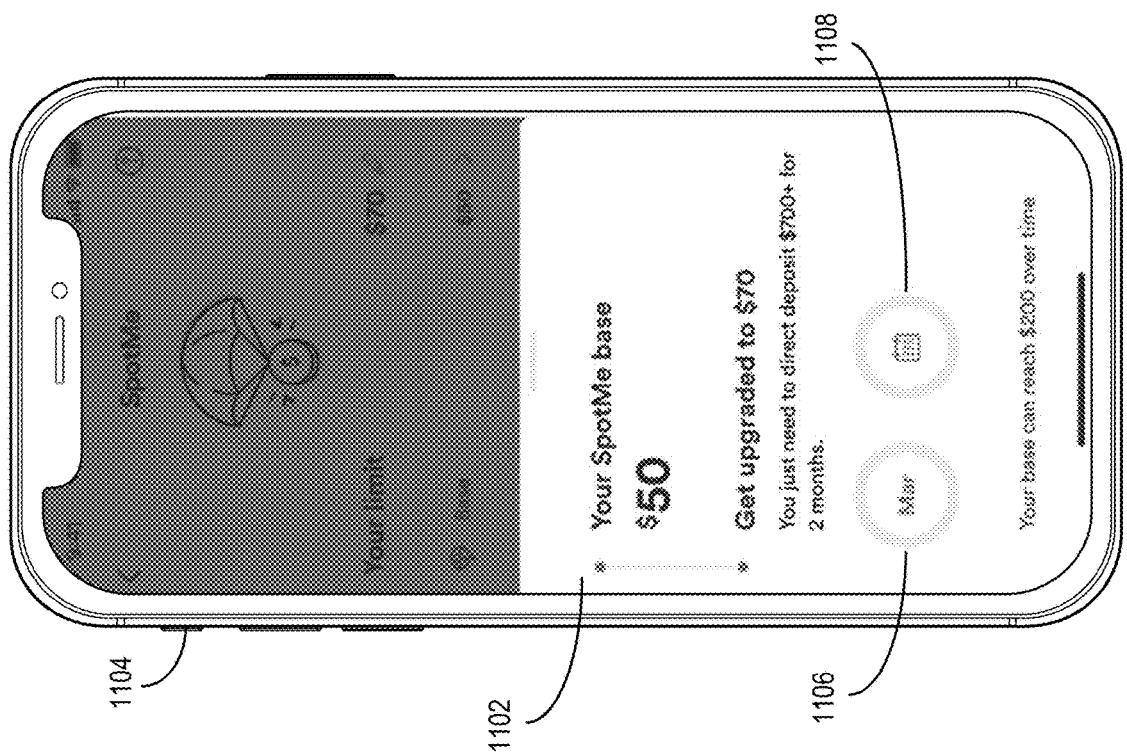

As further shown in the transition from FIG. 11A to FIG. 11B, upon receiving one or more user activities towards the user activity conditions to achieve the subsequent base limit value (in the first time-based segment) (e.g., determining one or more user activities occurring during the first time-based segment), the dynamic base value modeling system 106 provides, for display within the graphical user interface 1102 of the client device 1104, a first base limit progress element 1110 to indicate partial progress towards fulfillment of the one or more user activity conditions in the first time-based segment. Moreover, as shown in FIG. 11B, the dynamic base value modeling system 106 continues to provide, for display within the graphical user interface 1102 in the client device 1104, the second base limit progress element 1108 without a designated time-based segment (e.g., an unspecified time or time segment).

Figure 11D:
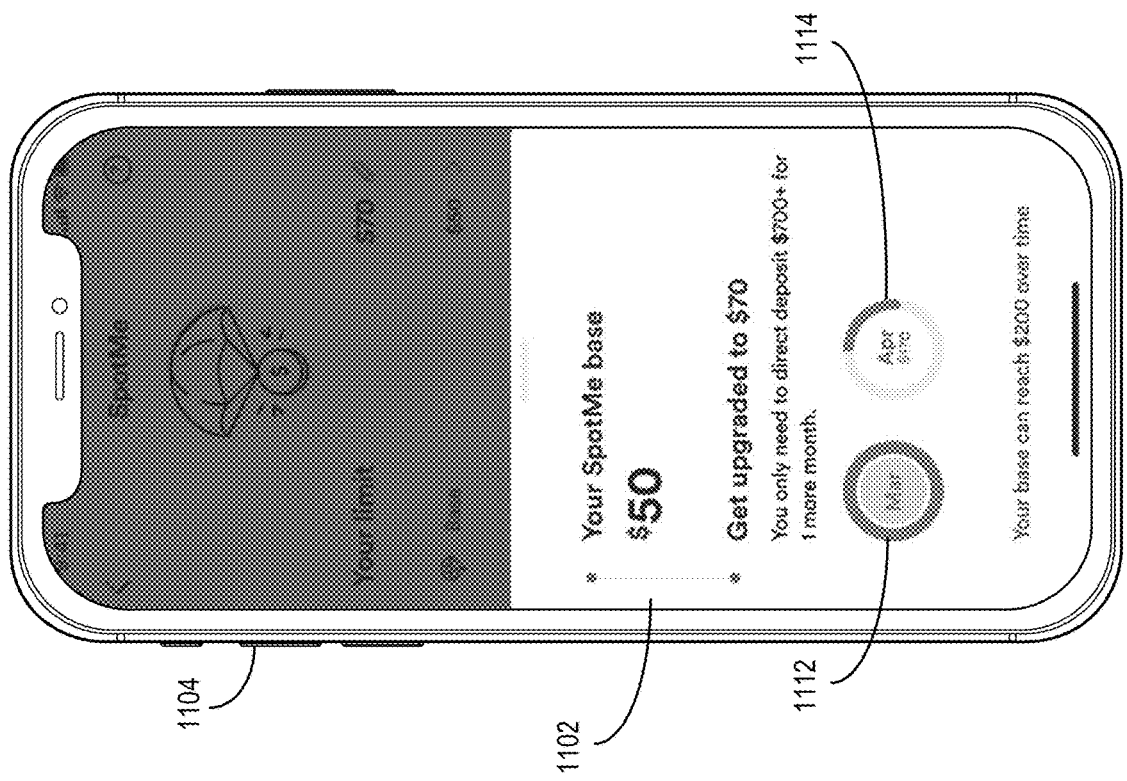
Figure 11C:
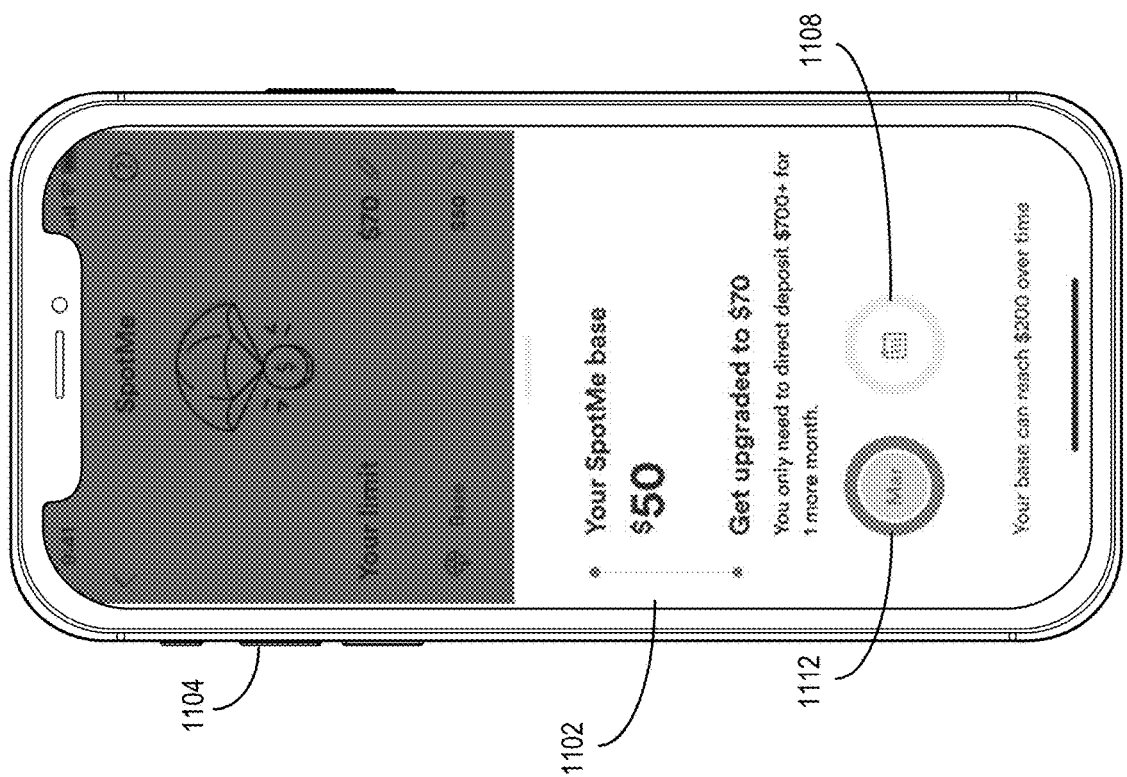

Additionally, as shown in the transition from FIG. 11B to FIG. 11C, upon satisfaction of the one or more user activity conditions corresponding to the first time-based segment (e.g., March), the dynamic base value modeling system 106 displays a first base limit progress element 1112 to depict completion of the user activity conditions corresponding to the first time-based segment. For example, as shown in FIG. 11C, the dynamic base value modeling system 106 can display the first base limit progress element 1112 with the entire border of the circular shape filled using a color element. Furthermore, as shown in FIG. 11C, the dynamic base value modeling system 106 displays the first base limit progress element 1112 with shading within the circular shape to indicate completion of the user activity conditions corresponding to the first time-based segment. In addition, as shown in FIG. 11C, the dynamic base value modeling system 106 continues to provide, for display within the graphical user interface 1102 in the client device 1104, the second base limit progress element 1108 without a designated time-based segment (e.g., an unspecified time or time segment) and depicting no progress.

Moreover, as shown in the transition from FIG. 11C to FIG. 11D, upon detecting one or more user activities (e.g., direct deposit transactions) within a second time-based segment (e.g., the month of April), the dynamic base value modeling system 106 provides, for display within the graphical user interface 1102 of the client device 1104, a second base limit progress element 1114 to indicate partial progress towards fulfillment of the one or more user activity conditions in the second time-based segment (instead of an unspecified time-based segment). As further shown in FIG. 11D, the dynamic base value modeling system 106 continues to display the first base limit progress element 1112 to depict completion of the user activity conditions corresponding to the first time-based segment. In one or more embodiments, the dynamic base value modeling system 106 updates the display of the second base limit progress element 1114 to indicate progress towards fulfillment of the one or more user activity conditions in the second time-based segment as the dynamic base value modeling system 106 detects updated user activities within the second time-based segment from the user account (e.g., determining one or more user activities occurring during the second time-based segment).

Figure 11F:
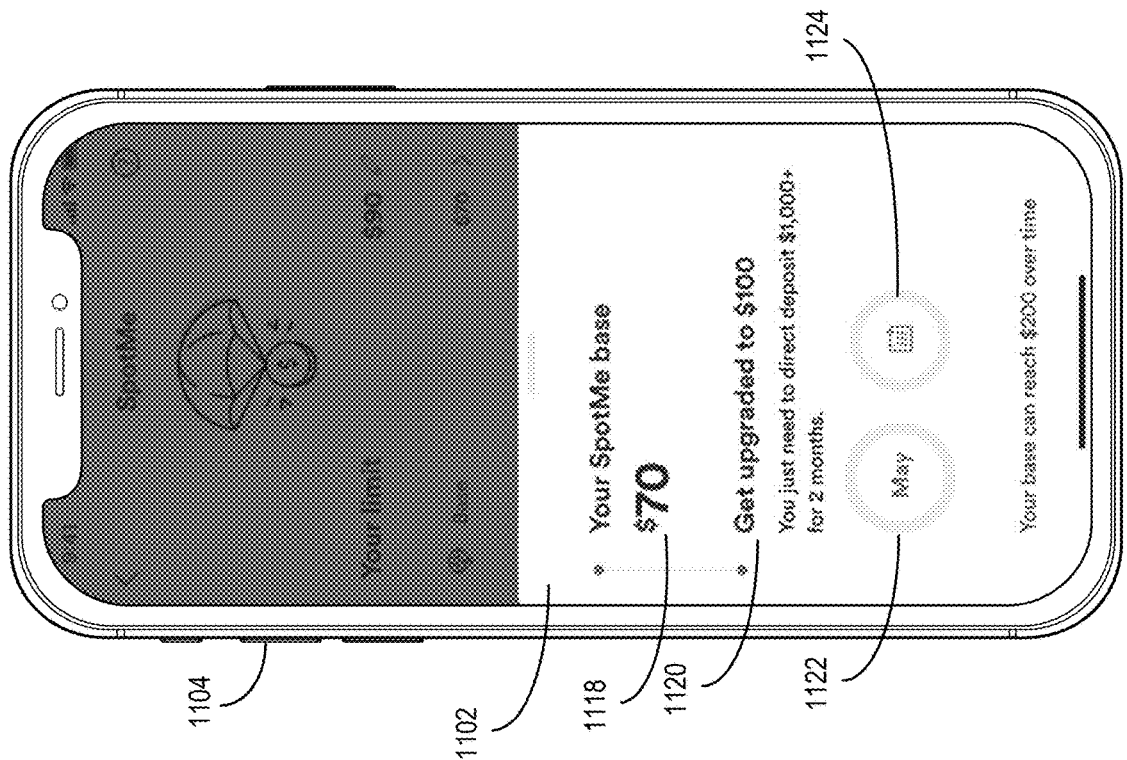
Figure 11E:
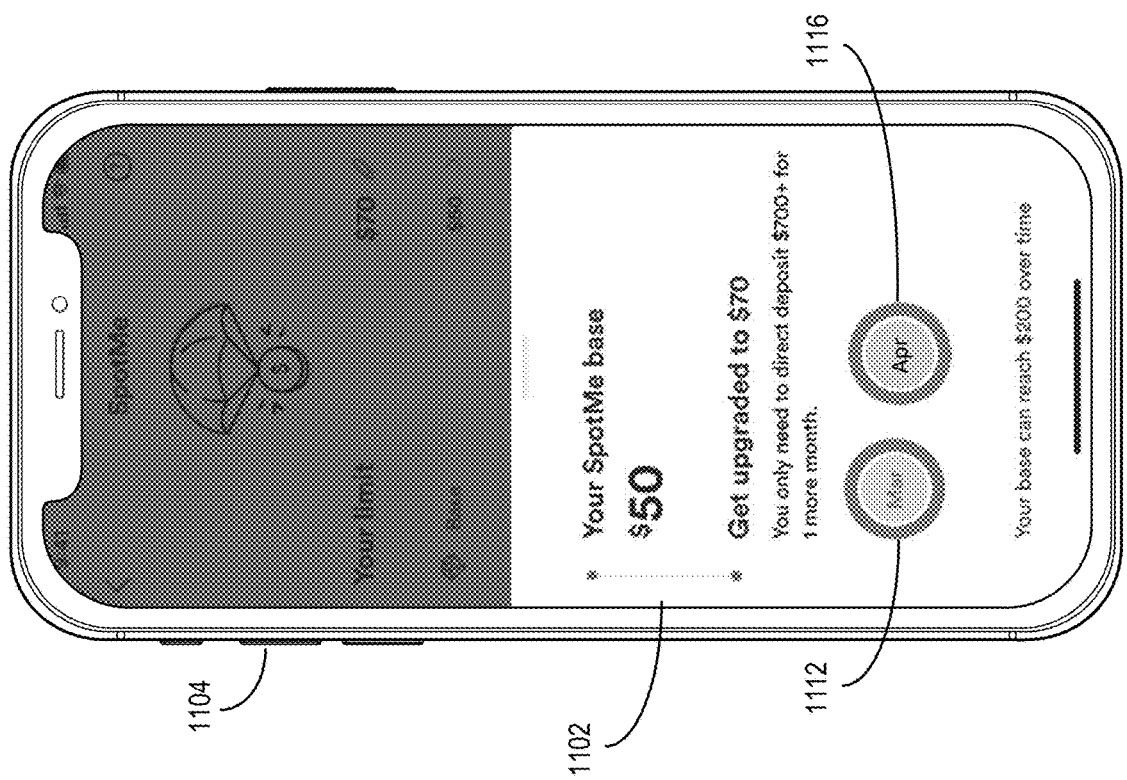

Furthermore, as shown in the transition from FIG. 11D to 11E, upon satisfaction of the one or more user activity conditions corresponding to the second time-based segment (e.g., April), the dynamic base value modeling system 106 displays (within the graphical user interface 1102 of the client device 1104) a second base limit progress element 1116 to depict completion of the user activity conditions corresponding to the second time-based segment. For instance, as shown in FIG. 11E, the dynamic base value modeling system 106 can display the second base limit progress element 1116 with the entire border of the circular shape filled using a color element. Additionally, as shown in FIG. 11E, the dynamic base value modeling system 106 displays the second base limit progress element 1116 with shading within the circular shape to indicate completion of the user activity conditions corresponding to the second time-based segment.

In addition, the dynamic base value modeling system 106 can, upon satisfaction of the user activity conditions in the multiple time-based segments, increase the base limit value to the subsequent base limit value for the user account and/or display one or more base limit progress elements for an additional base limit value after the subsequent base limit value. For instance, as shown in the transition from FIG. 11E to FIG. 11F, the dynamic base value modeling system 106, upon satisfaction of the user activity conditions in the multiple time-based segments indicated by the first base limit progress element 1112 and the second base limit progress element 1116, displays an increased base limit value 1118 within the graphical user interface 1102 of the client device 1104. Additionally, as shown in FIG. 11F, the dynamic base value modeling system 106 also displays, within the graphical user interface 1102, a user interface element 1120 that indicates user activity conditions to achieve a subsequent base limit value (from the increased base limit value 1118).

As further shown in FIG. 11F, upon satisfaction of the user activity conditions in the multiple time-based segments illustrated in FIG. 11E, the dynamic base value modeling system 106 provides, for display within the graphical user interface 1102 in the client device 1104, a first base limit progress element 1122 for progress towards the subsequent base limit value indicated in the user interface element 1120 in a first time-based segment (e.g., with no progress in the month of May). In addition, as shown in FIG. 11F, the dynamic base value modeling system 106 provides, for display within the graphical user interface 1102 in the client device 1104, a second base limit progress element 1124 without a designated time-based segment (e.g., an unspecified time or time segment) and depicting no progress towards the subsequent base limit value indicated in the user interface element 1120. The dynamic base value modeling system 106 can continue to detect user activities toward fulfillment of the one or more user activity conditions corresponding to the first base limit progress element 1122 and the second base limit progress element 1124 and update the display of the first base limit progress element 1122 and the second base limit progress element 1124 to indicate progress towards the subsequent base limit value indicated in the user interface element 1120 (in accordance with one or more implementations herein).

In some embodiments, the dynamic base value modeling system 106 displays base limit progress elements for non-consecutive time-based segments. For instance, in one or more embodiments, the dynamic base value modeling system 106 can track and determine that a user account failed to complete user activity conditions in a time-based segment. In response to the failed completion of user activity conditions in the time-based segment, the dynamic base value modeling system 106 can display an additional base limit progress element for a non-consecutive time-based segment (e.g., by removing the incomplete time-based segment and including the next time-based segment).

Figure 12:
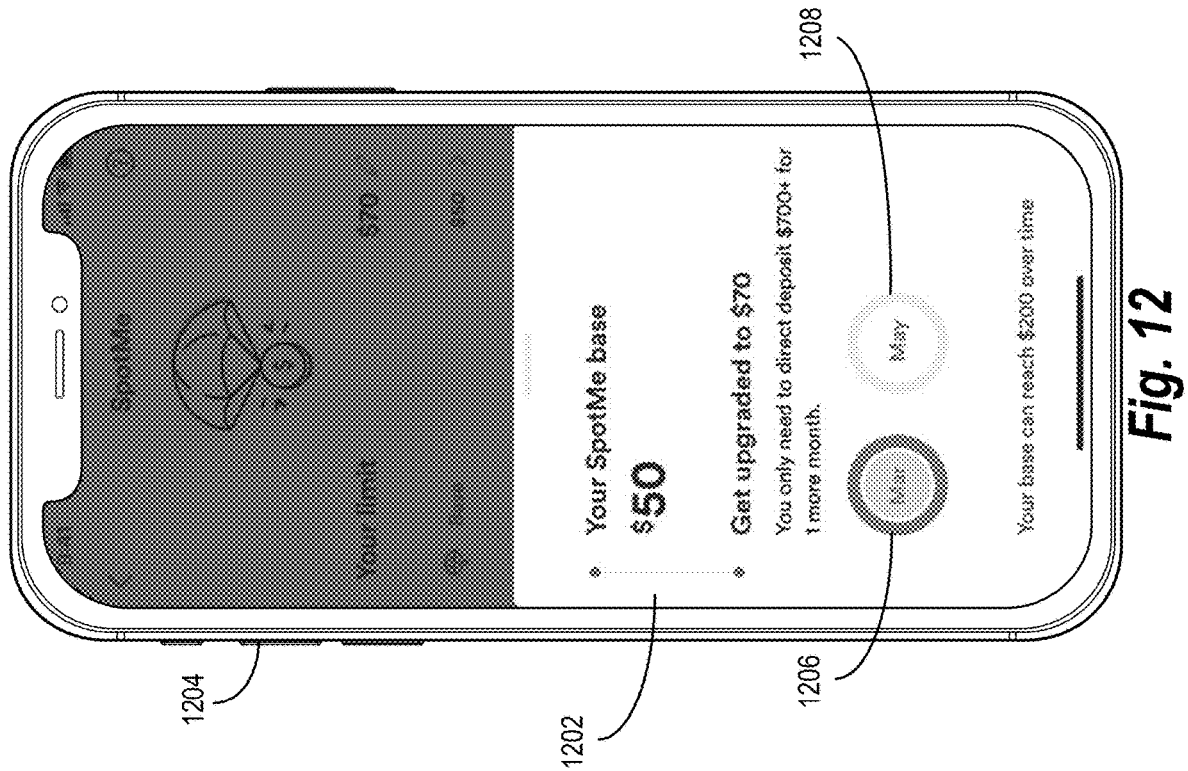
FIG. 12 illustrates a dynamic base value modeling system displaying base limit progress elements for non-consecutive time-based segments in accordance with one or more implementations.

As an example, FIG. 12 illustrates the dynamic base value modeling system 106 displaying base limit progress elements for non-consecutive time-based segments. As shown in FIG. 12, the dynamic base value modeling system 106 provides, for display within a graphical user interface 1202 of a client device 1204, a (completed) first base limit progress element 1206 for a first time-based segment (e.g., for the month of March). Moreover, as shown in FIG. 12, the dynamic base value modeling system 106 provides, for display within a graphical user interface 1202 of a client device 1204, a second base limit progress element 1208 for a second time-based segment (e.g., for the month of May) that is not consecutive to the first time-based segment.

In one or more embodiments, the dynamic base value modeling system 106 displays various combinations of base limit progress elements that correspond to consecutive and/or non-consecutive time-based segments. Indeed, in some implementations, the dynamic base value modeling system 106 removes, from display, base limit progress elements that correspond to time-based segments in which the dynamic base value modeling system 106 determined a failure to complete one or more user activity conditions (e.g., determining that a direct deposit requirement was not met in a specific month). In addition, the dynamic base value modeling system 106 can continue to add, from display, base limit progress elements corresponding to time-based segments in which the dynamic base value modeling system 106 determines satisfaction of one or more user activity conditions and/or detecting an active tracking of user activities towards fulfilling one or more user activity conditions (e.g., in a current time-based segment).

Figure 13B:
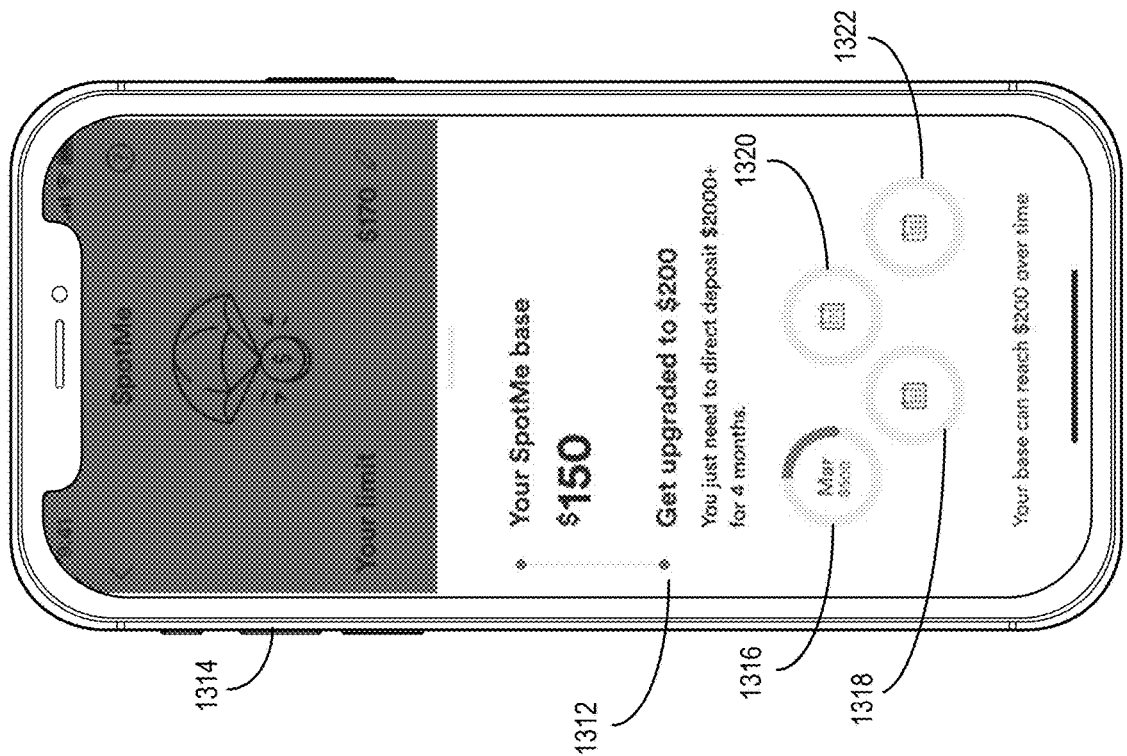
FIGS. 13A-13B illustrate a dynamic base value modeling system varying base limit progress elements for varying time-based segments in accordance with one or more implementations.
Figure 13A:
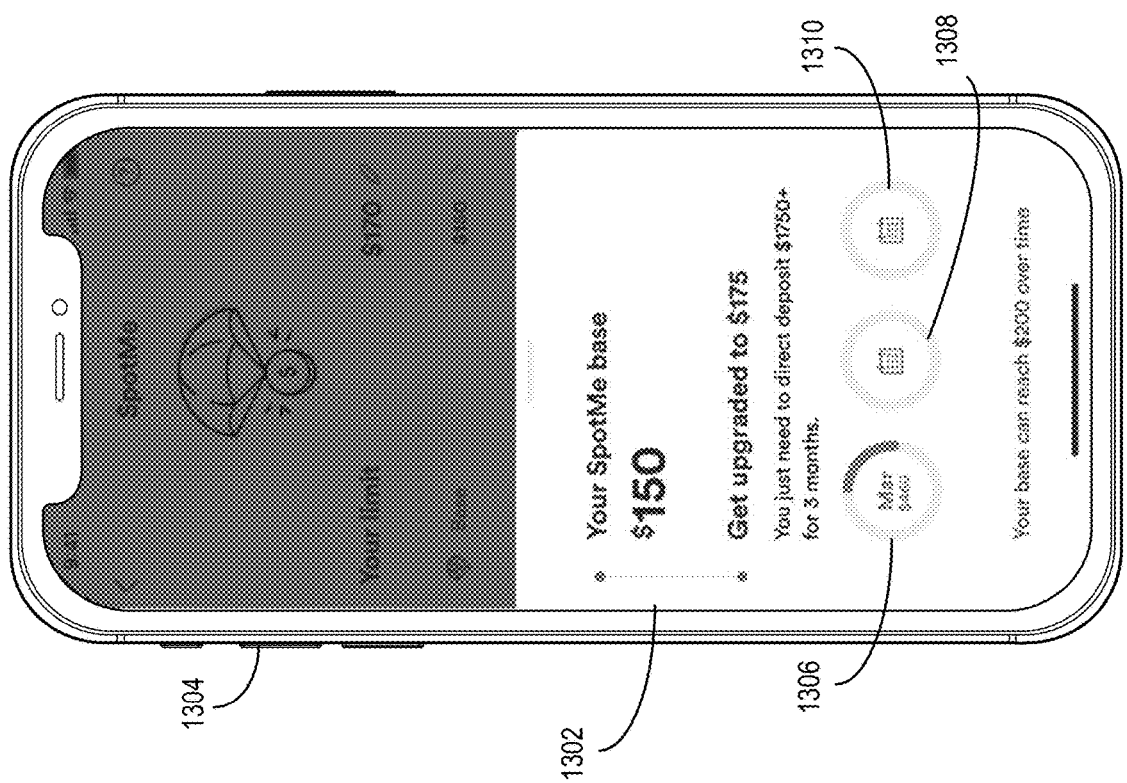

Furthermore, the dynamic base value modeling system 106 can display various numbers of base limit progress elements for various numbers of time-based segments within a graphical user interface. For instance, FIG. 13A illustrates the dynamic base value modeling system 106 providing, for display within a graphical user interface 1302 of a client device 1304, a first base limit progress element 1306 for a first time-based segment, a second base limit progress element 1308 for a second time-based segment, and a third base limit progress element 1310 for a third time-based segment. Moreover, FIG. 13B illustrates the dynamic base value modeling system 106 providing, for display within a graphical user interface 1312 of a client device 1314, a first base limit progress element 1316 for a first time-based segment, a second base limit progress element 1318 for a second time-based segment, a third base limit progress element 1320 for a third time-based segment, and a fourth base limit progress element 1322 for a fourth time-based segment.

Figure 14:
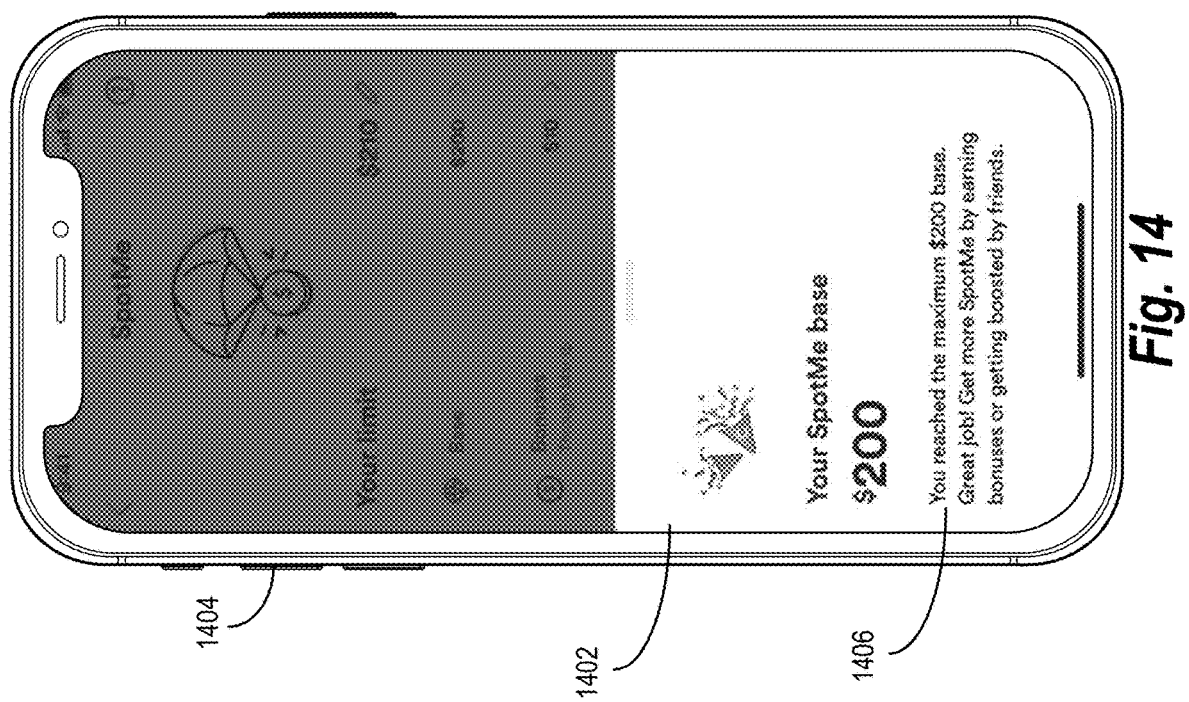
FIG. 14 illustrates a dynamic base value modeling system displaying a graphical user interface indicating a maximum available base limit value in accordance with one or more implementations.

In certain cases, the dynamic base value modeling system 106 detects that a user account reaches a maximum available base limit upon completion of one or more user activity conditions. Upon detecting that a user account reaches the maximum available base limit, the dynamic base value modeling system 106 can display a graphical user interface to indicate the maximum available base limit. For instance, FIG. 14 illustrates the dynamic base value modeling system 106 providing, for display within a graphical user interface 1402 in a client device 1404, a user interface element 1406 indicating the achievement of the maximum available base limit value (e.g., without displaying base limit progress elements).

Although FIGS. 7A-7B, 8A-8B, 9A-9B, 10A-10B, 11A-11F, 12, 13A-13B, and 14 illustrate the dynamic base value modeling system 106 displaying various user interface elements and a particular graphical user interface structure, the dynamic base value modeling system 106 can generate various user interface elements and/or structure to display information for the base limit value, subsequent base limit value, and/or the user activity conditions to achieve the subsequent base limit value. For example, the dynamic base value modeling system 106 can display a variety of user interface elements such as, but not limited to, sliding bars, progress charts, electronic calendars, and/or timelines. Moreover, the dynamic base value modeling system 106 can display the user interface elements to display information for the base limit value, subsequent base limit value, and/or the user activity conditions to achieve the subsequent base limit value in various organizational orders.

Furthermore, although FIGS. 7A-7B, 8A-8B, 9A-9B, 10A-10B, 11A-11F, 12, 13A-13B, and 14 illustrate the dynamic base value modeling system 106 displaying various user interface elements for tracking progress of a base limit value of a user account, the dynamic base value modeling system 106 can generate and display the user interface progress elements (as described above) to track the progress of various other user account values. For example, the dynamic base value modeling system 106 can generate and display user interface progress elements for tracking progress of a risk assessment value and/or a credit value for a user account.

For instance, the dynamic base value modeling system 106 can generate and display the user interface progress elements (as described above) to track progress of a risk assessment value (e.g., a credit score) for a user account, a subsequent risk assessment value for the user account, and user activities required to achieve the subsequent risk assessment value. For example, the dynamic base value modeling system 106 can display user interface progress elements (as described herein) that indicate repayment amounts for various time segments that, upon satisfaction, can increase a risk assessment value for the user account.

Moreover, in some implementations, the dynamic base value modeling system 106 can generate and display the user interface progress elements (as described above) to track progress of a credit value (e.g., a lending value) for a user account, a subsequent credit value for the user account, and user activities required to achieve the subsequent credit value. For instance, the dynamic base value modeling system can display user interface progress elements (as described herein) that indicate deposit transaction activity amounts (or tiers) required in various time segments that, upon satisfaction, can increase an available credit value for the user account.

As mentioned above, the dynamic base value modeling system 106 improves the accuracy of base limit values and activity score (risk indicators) for user accounts. For example, experimenters utilized an implementation of the dynamic base value modeling system in accordance with one or more embodiments between a first implementation that included a simple base limit value, a second implementation that included a tier-based base limit value, and a third implementation that included a dynamic base limit value utilizing a base limit value model and activity score (e.g., an implementation of the dynamic base value modeling system 106 in accordance with one or more embodiments). Upon comparison, the third implementation of the dynamic base value modeling system 106 resulted in a reduction in unpaid base limit value risk by 15% from the second implementation and a reduction in unpaid base limit value risk by 23% from the first implementation.

Turning now to FIG. 15, this figure shows a flowchart of a series of acts 1500 for displaying base limit progress elements to track user activity conditions to achieve a subsequent base limit value in accordance with one or more implementations. While FIG. 15 illustrates acts according to one embodiment, alternative embodiments may omit, add to, reorder, and/or modify any of the acts shown in FIG. 15. The acts of FIG. 15 can be performed as part of a method. Alternatively, a non-transitory computer readable storage medium can comprise instructions that, when executed by the one or more processors, cause a computing device to perform the acts depicted in FIG. 15. In still further embodiments, a system can perform the acts of FIG. 15.

As shown in FIG. 15, the series of acts 1500 include an act 1510 of determining a base limit value, a subsequent base limit value, and user activity conditions to achieve the subsequent base limit value. In particular, the act 1510 can include determining, utilizing a machine learning model, a base limit value for a user account, a subsequent base limit value, and one or more user activity conditions to achieve the subsequent base limit value. In some cases, the act 1510 includes utilizing a machine learning model to generate an activity score from user activity data corresponding to a user account and determining a base limit value, a subsequent base limit value, and one or more user activity conditions to achieve the subsequent base limit value by utilizing the user activity score with a base limit value model comprising mappings between user activity scores and base limit values. As further shown in FIG. 15, the series of acts 1500 include an act 1520 of providing an indication of the base limit value and the subsequent base limit value. For instance, the act 1520 can include providing, for display within a graphical user interface of a computing device corresponding to a user account, an indication of a base limit value and a subsequent base limit value.

For example, a base limit value can represent an excess utilization buffer for the user account. Additionally, a user activity can include a deposit transaction activity from a user account. Furthermore, a user activity condition can include a deposit transaction value condition for a user account within a time frame to increase a base limit value to a subsequent base limit value for a user account.

As shown in FIG. 15, the series of acts 1500 also include an act 1530 of providing a first base limit progress element for a first time-based segment and a second base limit progress element for a second time-based segment. In particular, the act 1530 can include providing, for display within a graphical user interface of a computing device corresponding to a user account, a first base limit progress element that indicates progress of one or more user activities toward fulfilling one or more user activity conditions in a first time-based segment and a second base limit progress element for a second time-based segment. In some cases, the act 1530 includes providing, for display within a graphical user interface of a computing device corresponding to a user account, a first base limit progress element to depict a fillable shape comprising an indication of a first time-based segment and a color element to track one or more user activities fulfilling one or more user activity conditions.

Additionally, the act 1530 can include determining partial fulfillment of one or more user activity conditions corresponding to a first time-based segment from one or more user activities occurring during a first time-based segment. Moreover, the act 1530 can include providing, for display within a graphical user interface of a computing device corresponding to a user account, a first base limit progress element to depict partial progress towards fulfillment of one or more user activity conditions based on partial fulfillment determined within a first time-based segment. Additionally, the act 1530 can include determining satisfaction of one or more user activity conditions corresponding to a first time-based segment from one or more user activities occurring during a first time-based segment and, based on a determined satisfaction of one or more user activity conditions corresponding to the first time-based segment, providing, for display within the graphical user interface of a computing device corresponding to a user account, a first user base limit progress element to depict completion of one or more user activity conditions corresponding to the first time-based segment.

Moreover, the act 1530 can include providing, for display within a graphical user interface of a computing device corresponding to a user account, a second base limit progress element to depict no progress towards fulfillment of one or more user activity conditions within a second time-based segment. In addition, the act 1530 can include determining partial fulfillment of one or more user activity conditions corresponding to a second time-based segment from one or more user activities occurring during the second time-based segment. Furthermore, the act 1530 can include providing, for display within a graphical user interface of a computing device corresponding to a user account, a second base limit progress element to depict partial progress towards fulfillment of one or more user activity conditions based on a partial fulfillment determined within a second time-based segment. Moreover, the act 1530 can include determining satisfaction of one or more user activity conditions corresponding to a second time-based segment from one or more user activities occurring during a second time-based segment and, based on the determined satisfaction of the one or more user activity conditions corresponding to the second time-based segment, providing, for display within a graphical user interface of a computing device corresponding to a user account, a second user base limit progress element to depict completion of the one or more user activity conditions corresponding to the second time-based segment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
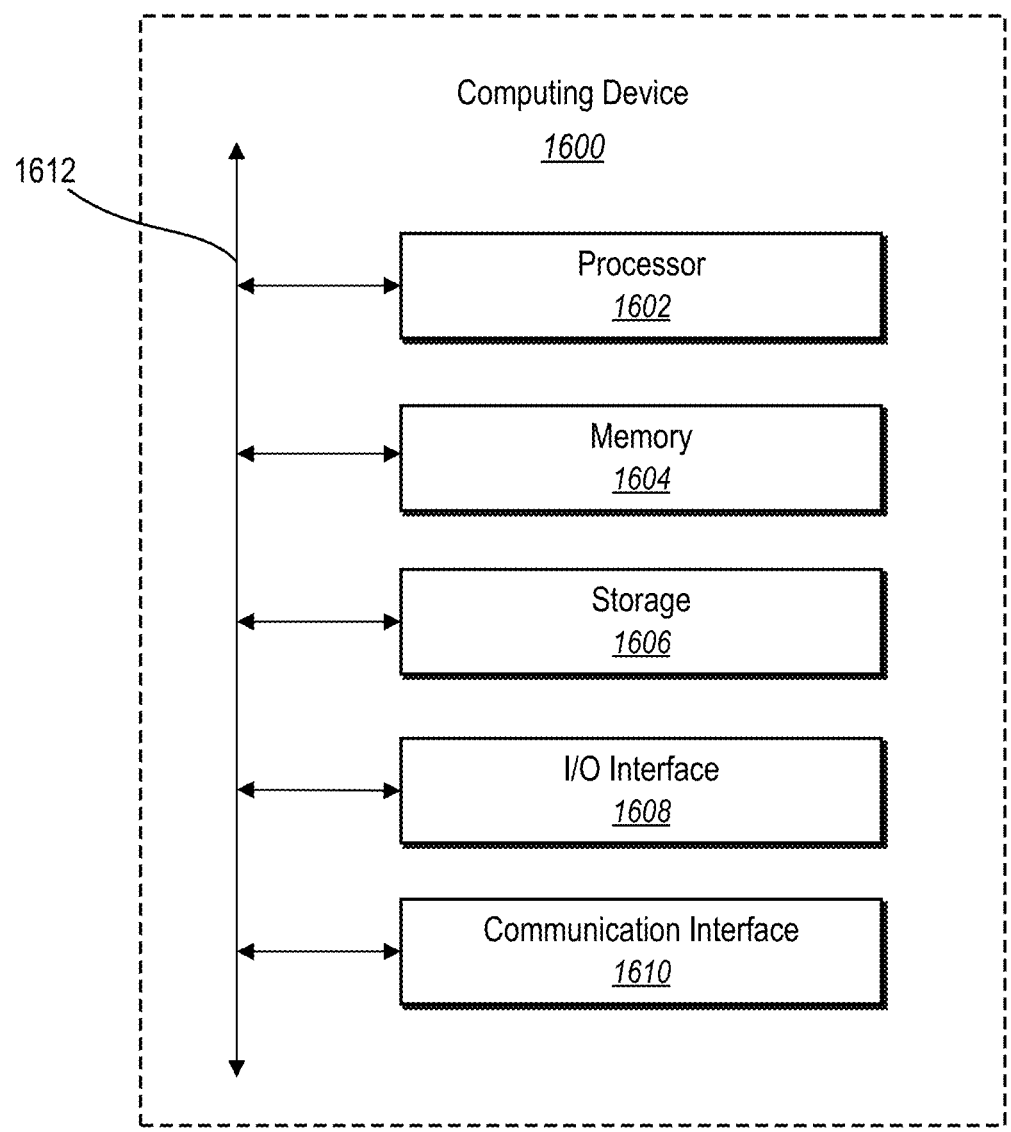
FIG. 16 illustrates a block diagram of an exemplary computing device in accordance with one or more implementations.

FIG. 16 illustrates, in block diagram form, an exemplary computing device 1600 that may be configured to perform one or more of the processes described above. One will appreciate that the dynamic base value modeling system 106 (or the inter-network facilitation system 104) can comprise implementations of a computing device, including, but not limited to, the devices or systems illustrated in the previous figures. As shown by FIG. 16, the computing device can comprise a processor 1602, memory 1604, a storage device 1606, an I/O interface 1608, and a communication interface 1610. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive ("HDD"), flash memory, a Universal Serial Bus ("USB") drive or a combination of these or other storage devices.

The computing device 1600 also includes one or more input or output ("I/O") interface 1608, which are provided to allow a user (e.g., requester or provider) to provide input to (such as user strokes), receive output from, and otherwise transfer data to and from the computing device 1600. These I/O interface 1608 may include a mouse, keypad or a keyboard, a touch screen, camera, optical scanner, network interface, modem, other known I/O devices or a combination of such I/O interface 1608. The touch screen may be activated with a stylus or a finger.

The I/O interface 1608 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller ("NIC") or network adapter for communicating with an Ethernet or other wire-based network or a wireless NIC ("WNIC") or wireless adapter for communicating with a wireless network, such as a WI-FI. The computing device 1600 can further include a bus 1612. The bus 1612 can comprise hardware, software, or both that couples components of computing device 1600 to each other.

Figure 17:
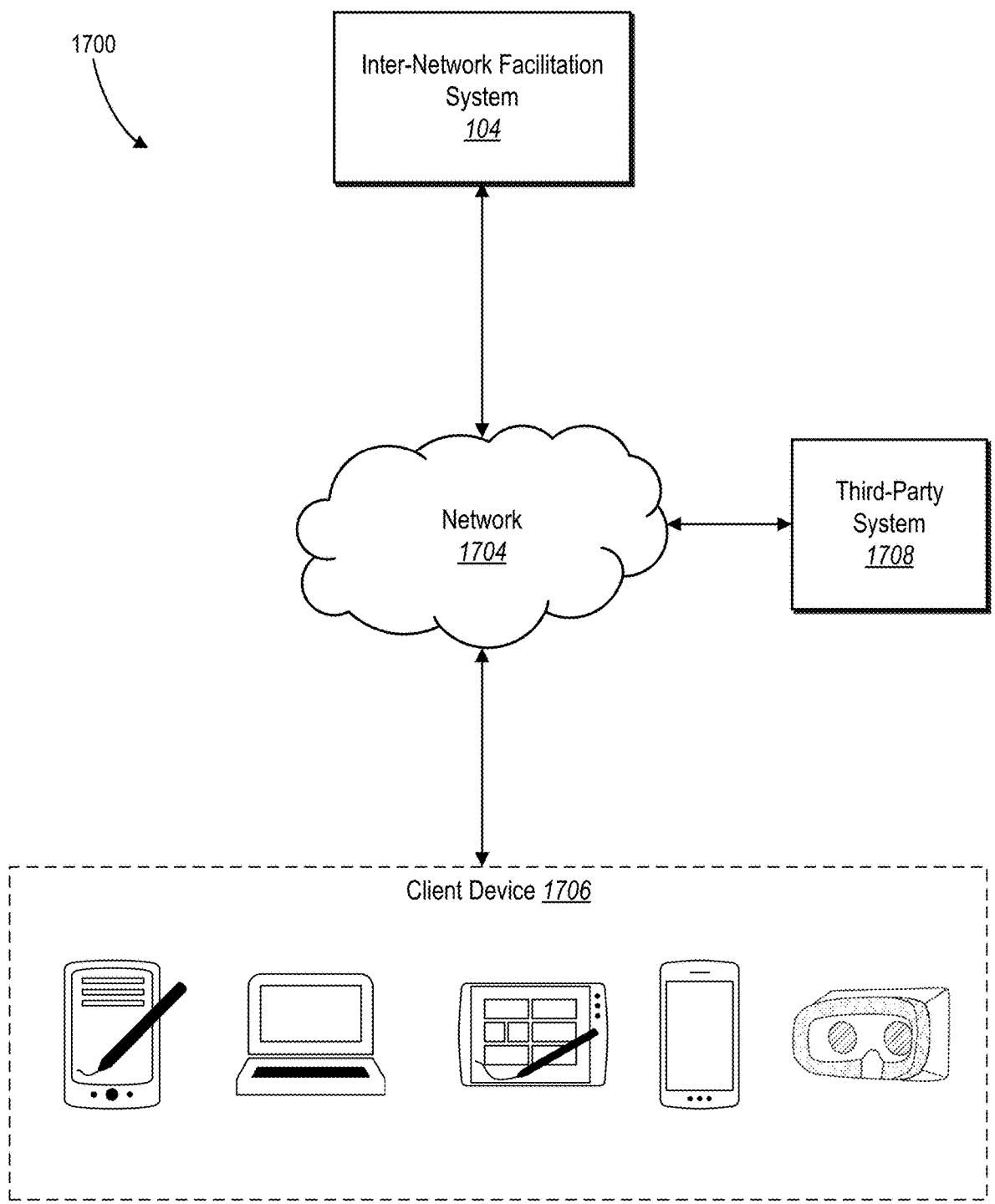
FIG. 17 illustrates an example environment for an inter-network facilitation system in accordance with one or more implementations.

FIG. 17 illustrates an example network environment 1700 of the inter-network facilitation system 104. The network environment 1700 includes a client device 1706 (e.g., client device 110), an inter-network facilitation system 104, and a third-party system 1708 connected to each other by a network 1704. Although FIG. 17 illustrates a particular arrangement of the client device 1706, the inter-network facilitation system 104, the third-party system 1708, and the network 1704, this disclosure contemplates any suitable arrangement of client device 1706, the inter-network facilitation system 104, the third-party system 1708, and the network 1704. As an example, and not by way of limitation, two or more of client device 1706, the inter-network facilitation system 104, and the third-party system 1708 communicate directly, bypassing network 1704. As another example, two or more of client device 1706, the inter-network facilitation system 104, and the third-party system 1708 may be physically or logically co-located with each other in whole or in part.

Moreover, although FIG. 17 illustrates a particular number of client devices 1706, inter-network facilitation systems 104, third-party systems 1708, and networks 1704, this disclosure contemplates any suitable number of client devices 1706, inter-network facilitation system 104, third-party systems 1708, and networks 1704. As an example, and not by way of limitation, network environment 1700 may include multiple client devices 1706, inter-network facilitation system 104, third-party systems 1708, and/or networks 1704.

This disclosure contemplates any suitable network 1704. As an example, and not by way of limitation, one or more portions of network 1704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1704 may include one or more networks 1704.

Links may connect client device 1706, inter-network facilitation system 104 (e.g., which hosts the dynamic base value modeling system 106), and third-party system 1708 to network 1704 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1700. One or more first links may differ in one or more respects from one or more second links.

In particular embodiments, the client device 1706 may be an electronic device including hardware, software, or embedded logic components or a combination of two or more such components and capable of carrying out the appropriate functionalities implemented or supported by client device 1706. As an example, and not by way of limitation, a client device 1706 may include any of the computing devices discussed above in relation to FIG. 16. A client device 1706 may enable a network user at the client device 1706 to access network 1704. A client device 1706 may enable its user to communicate with other users at other client devices 1706.

In particular embodiments, the client device 1706 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1706 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1706 one or more Hyper Text Markup Language ("HTML") files responsive to the HTTP request. The client device 1706 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1704) to link the third-party-system 1708. For example, the inter-network facilitation system 104 may receive authentication credentials from a user to link a third-party system 1708 such as an online bank account, credit account, debit account, or other financial account to a user account within the inter-network facilitation system 104. The inter-network facilitation system 104 can subsequently communicate with the third-party system 1708 to detect or identify balances, transactions, withdrawal, transfers, deposits, credits, debits, or other transaction types associated with the third-party system 1708. The inter-network facilitation system 104 can further provide the aforementioned or other financial information associated with the third-party system 1708 for display via the client device 1706. In some cases, the inter-network facilitation system 104 links more than one third-party system 1708, receiving account information for accounts associated with each respective third-party system 1708 and performing operations or transactions between the different systems via authorized network connections.

In particular embodiments, the inter-network facilitation system 104 may interface between an online banking system and a credit processing system via the network 1704. For example, the inter-network facilitation system 104 can provide access to a bank account of a third-party system 1708 and linked to a user account within the inter-network facilitation system 104. Indeed, the inter-network facilitation system 104 can facilitate access to, and transactions to and from, the bank account of the third-party system 1708 via a client application of the inter-network facilitation system 104 on the client device 1706. The inter-network facilitation system 104 can also communicate with a credit processing system, an ATM system, and/or other financial systems (e.g., via the network 1704) to authorize and process credit charges to a credit account, perform ATM transactions, perform transfers (or other transactions) across accounts of different third-party systems 1708, and to present corresponding information via the client device 1706.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1708), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1700 either directly or via network 1704. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1706, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1704.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1706. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1706. Information may be pushed to a client device 1706 as notifications, or information may be pulled from client device 1706 responsive to a request received from client device 1706. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1706 associated with users.

In addition, the third-party system 1708 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1704. A third-party system 1708 can communicate with the inter-network facilitation system 104 to provide financial information pertaining to balances, transactions, and other information, whereupon the inter-network facilitation system 104 can provide corresponding information for display via the client device 1706. In particular embodiments, a third-party system 1708 communicates with the inter-network facilitation system 104 to update account balances, transaction histories, credit usage, and other internal information of the inter-network facilitation system 104 and/or the third-party system 1708 based on user interaction with the inter-network facilitation system 104 (e.g., via the client device 1706). Indeed, the inter-network facilitation system 104 can synchronize information across one or more third-party systems 1708 to reflect accurate account information (e.g., balances, transactions, etc.) across one or more networked systems, including instances where a transaction (e.g., a transfer) from one third-party system 1708 affects another third-party system 1708.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining a base limit value for a user account indicating an excess utilization buffer for the user account by:
      determining that the user account corresponds to a first user account grouping from a set of different groupings of user accounts;
      selecting, based on the user account corresponding to the first user account grouping, an activity machine learning model from a set of activity machine learning models, wherein each of the set of activity machine learning models comprise learned parameters specific to different sets of user activity training data from the set of different groupings of user accounts;
      generating an activity score by utilizing the activity machine learning model to analyze user activity data of the user account; and
      utilizing the activity score with a base limit value model to determine the base limit value;
   determining a subsequent base limit value indicating an additional excess utilization buffer achievable for the user account and one or more user activity conditions to achieve the subsequent base limit value from the base limit value model utilizing the base limit value and the activity score;
   providing, for display within a graphical user interface of a computing device corresponding to the user account, a first base limit progress element that indicates progress of one or more user activities toward fulfilling the one or more user activity conditions; and
   upon determining partial fulfillment of the one or more user activity conditions to achieve the subsequent base limit value from the base limit value model, modifying the first base limit progress element to reflect the partial fulfillment.

2. The computer-implemented method of claim 1, wherein the user activity data of the user account comprises one or more deposit transaction activities of the user account.

3. The computer-implemented method of claim 1, further comprising determining the one or more user activity conditions to achieve the subsequent base limit value by identifying, from base limit value model, one or more deposit transaction value conditions for the user account to increase the base limit value to the subsequent base limit value.

4. The computer-implemented method of claim 1, further comprising determining that the user account corresponds to the first user account grouping based on a comparison between a user activity duration corresponding to the user account and user activity durations corresponding to each of the set of different groupings of user accounts.

5. The computer-implemented method of claim 1, wherein the base limit value model comprises a mapping between activity scores, base limit values, and user activity conditions.

6. The computer-implemented method of claim 1, further comprising:
   determining satisfaction of the one or more user activity conditions corresponding to a first time-based segment; and
   based on the determined satisfaction of the one or more user activity conditions corresponding to the first time-based segment, modifying the first base limit progress element to depict completion of the one or more user activity conditions.

7. The computer-implemented method of claim 6, further comprising providing, for display within the graphical user interface of the computing device corresponding to the user account, a second base limit progress element that indicates additional progress of one or more additional user activities toward fulfilling one or more additional user activity conditions in a second time-based segment.

8. The computer-implemented method of claim 7, further comprising, upon determining an additional partial fulfillment of the one or more additional user activity conditions to achieve the subsequent base limit value from the base limit value model, modifying the second base limit progress element to reflect the additional partial fulfillment.

9. The computer-implemented method of claim 1, further comprising providing, for display within the graphical user interface of the computing device corresponding to the user account, the first base limit progress element as a graphical fillable shape tracking the progress of one or more user activities toward fulfilling the one or more user activity conditions.

10. A non-transitory computer-readable medium storing instructions that, when executed by at least one processor, cause a computing device to:
   determine a base limit value for a user account indicating an excess utilization buffer for the user account by:
      determining that the user account corresponds to a first user account grouping from a set of different groupings of user accounts;
      selecting, based on the user account corresponding to the first user account grouping, an activity machine learning model from a set of activity machine learning models, wherein each of the set of activity machine learning models comprise learned parameters specific to different sets of user activity training data from the set of different groupings of user accounts;
      generating an activity score by utilizing the activity machine learning model to analyze user activity data of the user account; and
      utilizing the activity score with a base limit value model to determine the base limit value;
   determine a subsequent base limit value indicating an additional excess utilization buffer achievable for the user account and one or more user activity conditions to achieve the subsequent base limit value from the base limit value model utilizing the base limit value and the activity score;
   provide, for display within a graphical user interface of a computing device corresponding to the user account, a first base limit progress element that indicates progress of one or more user activities toward fulfilling the one or more user activity conditions; and
   upon determining partial fulfillment of the one or more user activity conditions to achieve the subsequent base limit value from the base limit value model, modify the first base limit progress element to reflect the partial fulfillment.

11. The non-transitory computer-readable medium of claim 10, further comprising instructions that, when executed by the at least one processor, cause the computing device to determine the one or more user activity conditions to achieve the subsequent base limit value by identifying, from base limit value model, one or more deposit transaction value conditions for the user account to increase the base limit value to the subsequent base limit value.

12. The non-transitory computer-readable medium of claim 10, further comprising instructions that, when executed by the at least one processor, cause the computing device to:
   train a first activity machine learning model, from the set of activity machine learning models, to generate activity scores utilizing a first set of user activity training data; and
   train a second activity machine learning model, from the set of activity machine learning models, to generate activity scores utilizing a second set of user activity training data.

13. The non-transitory computer-readable medium of claim 10, further comprising instructions that, when executed by the at least one processor, cause the computing device to determine that the user account corresponds to the first user account grouping based on a comparison between a user activity duration corresponding to the user account and user activity durations corresponding to each of the set of different groupings of user accounts.

14. The non-transitory computer-readable medium of claim 10, further comprising instructions that, when executed by the at least one processor, cause the computing device to:
   determine satisfaction of the one or more user activity conditions corresponding to a first time-based segment; and
   based on the determined satisfaction of the one or more user activity conditions corresponding to a first time-based segment, provide, for display within the graphical user interface of the computing device corresponding to the user account, modifying the first base limit progress element to depict completion of the one or more user activity conditions.

15. The non-transitory computer-readable medium of claim 10, further comprising instructions that, when executed by the at least one processor, cause the computing device to provide, for display within the graphical user interface of the computing device corresponding to the user account, a second base limit progress element that indicates additional progress of one or more additional user activities toward fulfilling one or more additional user activity conditions in a second time-based segment.

16. A system comprising:
   at least one processor; and
   at least one non-transitory computer-readable storage medium storing instructions that, when executed by the at least one processor, cause the system to:
      determine a base limit value for a user account indicating an excess utilization buffer for the user account by:

determining that the user account corresponds to a first user account grouping from a set of different groupings of user accounts;

selecting, based on the user account corresponding to the first user account grouping, an activity machine learning model from a set of activity machine learning models, wherein each of the set of activity machine learning models comprise learned parameters specific to different sets of user activity training data from the set of different groupings of user accounts;

generating an activity score by utilizing the activity machine learning model to analyze user activity data of the user account; and utilizing the activity score with a base limit value model to determine the base limit value;

determine a subsequent base limit value indicating an additional excess utilization buffer achievable for the user account and one or more user activity conditions to achieve the subsequent base limit value from the base limit value model utilizing the base limit value and the activity score;

provide, for display within a graphical user interface of a computing device corresponding to the user account, a first base limit progress element that indicates progress of one or more user activities toward fulfilling the one or more user activity conditions; and upon determining partial fulfillment of the one or more user activity conditions to achieve the subsequent base limit value from the base limit value model, modify the first base limit progress element to reflect the partial fulfillment.

17. The system of claim 16, further comprising instructions that, when executed by the at least one processor, cause the system to determine the one or more user activity conditions to achieve the subsequent base limit value by identifying, from base limit value model, one or more deposit transaction value conditions for the user account to increase the base limit value to the subsequent base limit value.

18. The system of claim 16, further comprising instructions that, when executed by the at least one processor, cause the system to determine that the user account corresponds to the first user account grouping based on a comparison between a user activity duration corresponding to the user account and user activity durations corresponding to each of the set of different groupings of user accounts.

19. The system of claim 16, further comprising instructions that, when executed by the at least one processor, cause the system to:

provide, for display within the graphical user interface of the computing device corresponding to the user account, a second base limit progress element that indicates additional progress of one or more additional user activities toward fulfilling one or more additional user activity conditions in a second time-based segment; and upon determining an additional partial fulfillment of the one or more additional user activity conditions to achieve the subsequent base limit value from the base limit value model, modify the second base limit progress element to reflect the additional partial fulfillment.

20. The system of claim 16, further comprising instructions that, when executed by the at least one processor, cause the system to provide, for display within the graphical user interface of the computing device corresponding to the user account, the first base limit progress element as a graphical fillable shape tracking the progress of one or more user activities toward fulfilling the one or more user activity conditions.

* * * * *